United States Patent
Sohma

(10) Patent No.: US 11,763,582 B2
(45) Date of Patent: Sep. 19, 2023

(54) INFORMATION PROCESSING APPARATUS, CONTROL METHOD OF INFORMATION PROCESSING APPARATUS, AND NON-TRANSITORY STORAGE MEDIUM

(71) Applicant: CANON KABUSHIKI KAISHA, Tokyo (JP)

(72) Inventor: Hidetomo Sohma, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/900,467

(22) Filed: Aug. 31, 2022

(65) Prior Publication Data

US 2023/0078322 A1    Mar. 16, 2023

(30) Foreign Application Priority Data

Sep. 13, 2021    (JP) ................. 2021-148345

(51) Int. Cl.
| | | |
|---|---|---|
| H04N 1/387 | (2006.01) | |
| G06V 30/14 | (2022.01) | |
| G06V 10/98 | (2022.01) | |
| G06V 30/148 | (2022.01) | |
| H04N 1/00 | (2006.01) | |
| G06V 30/262 | (2022.01) | |

(52) U.S. Cl.
CPC ........ *G06V 30/1456* (2022.01); *G06V 10/993* (2022.01); *G06V 30/148* (2022.01); *G06V 30/1448* (2022.01); *G06V 30/262* (2022.01); *H04N 1/00018* (2013.01); *H04N 1/00068* (2013.01); *H04N 1/00816* (2013.01)

(58) Field of Classification Search
None
See application file for complete search history.

(56) References Cited

U.S. PATENT DOCUMENTS

| | | | |
|---|---|---|---|
| 10,963,717 B1 * | 3/2021 | Corcoran | G06V 30/40 |
| 2021/0174109 A1 * | 6/2021 | Beller | G06V 30/416 |
| 2022/0350998 A1 * | 11/2022 | Desai | G06N 3/0455 |

FOREIGN PATENT DOCUMENTS

| | | | |
|---|---|---|---|
| JP | H06195387 A | | 7/1994 |
| JP | 2021064122 A | * | 4/2021 |

* cited by examiner

*Primary Examiner* — Dung D Tran
(74) *Attorney, Agent, or Firm* — ROSSI, KIMMS & McDOWELL LLP

(57) ABSTRACT

Provided is an information processing apparatus that applies correction using a character recognition error pattern to a character recognition result of a document image, wherein the character recognition error pattern includes error pattern information on a character recognition result of a part where an error occurs in character recognition, correct pattern information applicable to the part where the error occurs, information on a frequency that the error occurs, and information on a state where the error occurs, and wherein the character recognition error pattern to be used in the correction is narrowed down based on the information on the frequency that the error occurs and the information on the state where the error occurs.

9 Claims, 22 Drawing Sheets

| Error pattern ID | Position of appearance in character string | Ruled line / Character background | Error pattern information | Correct pattern information | (Occurrence) frequency |
|---|---|---|---|---|---|
| ... | ... | ... | ... | ... | ... |
| 101 | middle | (N/A) | 6 | 5 | 0.80 |
| 102 | middle | (N/A) | 1 | 7 | 0.70 |
| 103 | middle | background color | 0 | 1 | 0.80 |
| ... | ... | ... | ... | ... | ... |
| 201 | beginning | forward | 0 | 8 | 0.62 |
| 202 | end | backward | 9 | 5 | 0.54 |
| 203 | beginning | (N/A) | 5 | 6 | 0.55 |
| ... | ... | ... | ... | ... | ... |

FIG. 5A

| Character recognition result ID | Position – size in document image | Character recognition result (maximum likelihood candidate character string) |
|---|---|---|
| 1 | (80, 50) – (80, 10) | Tokyo stat ion front store |
| ... | ... | ... |
| 10 | (40, 80) – (25, 10) | TEL |
| 11 | (70, 80) – (110, 10) | 03-1234-6678 |
| ... | ... | ... |
| 20 | (20, 105) – (250, 10) | November 06, 2019 ... |
| ... | ... | ... |
| 30 | (40, 160) – (60, 20) | Total |
| 31 | (170, 160) – (40, 10) | ¥360 |
| ... | ... | ... |

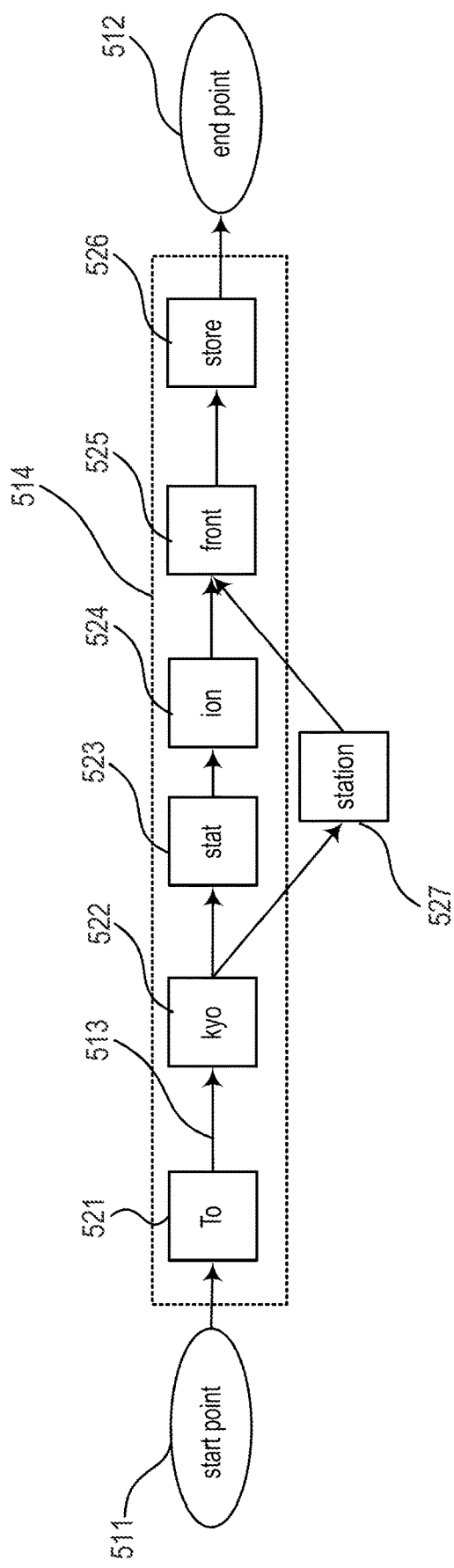
FIG. 5B1

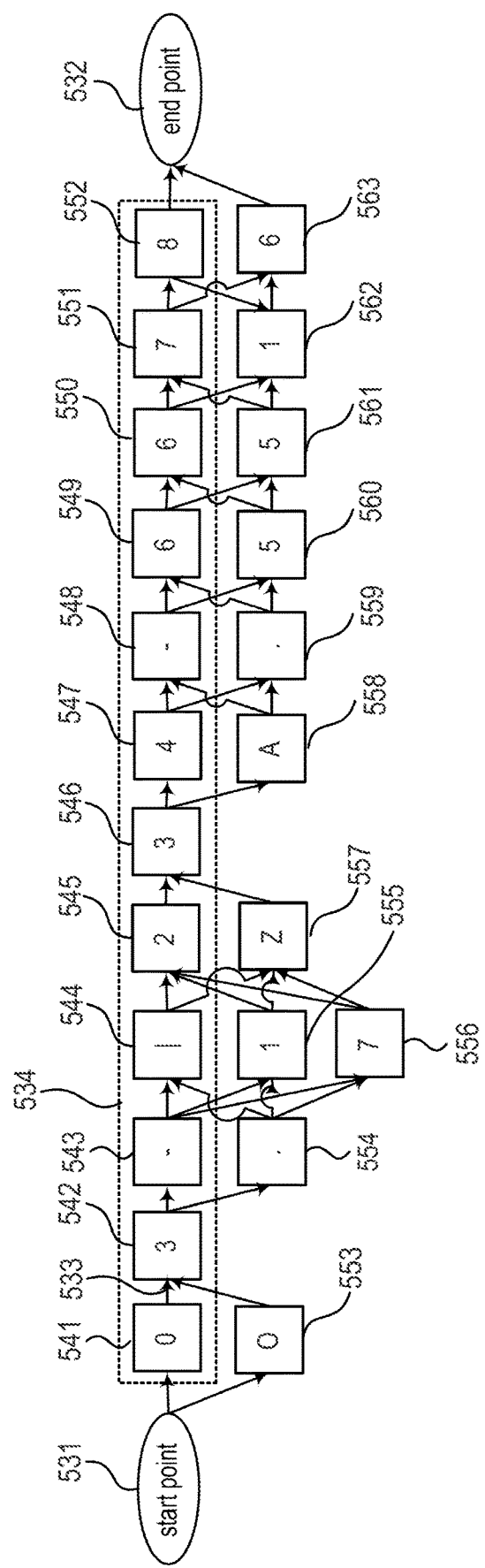
FIG. 5B2

FIG. 7A1

| Extraction rule ID | Extracted item | Position of item value | Character string of item name | Character string pattern of item value | Relative direction of item value relative to position of item name |
|---|---|---|---|---|---|
| 1 | issuance source | fixed (uppermost level) | (N/A) | (N/A) | (N/A) |
| 2 | issuance date | variable | (N/A) | DATE type | (N/A) |
| 3 | telephone number | variable | TEL, telephone number ☏ | TEL type | right |
| 4 | total price | variable | total, total including tax | MONEY type | right |
| 5 | (product name, price) | variable | [product name dictionary] | MONEY type | right |

FIG. 7A2

| Extraction restriction ID | Character string pattern name | Character string pattern | Normalization / interpretation information |
|---|---|---|---|
| 1 | DATE type | [0-9]+year[0-9]+month[0-9]+day \| [0-9]+/[0-9]+/[0-9]+ | Y (integer [4 digits]), M (integer [1 to 12]), D (integer [1 to 31]) |
| 2 | TEL type | 0[0-9]+-[0-9]+-[0-9]+ | numeric character string [10 to 11 digits] |
| 3 | MONEY type | ¥?[1-9][0-9]?yen? | integer |

FIG. 7B1

| Product ID | Product name |
|---|---|
| x o x | * * * |
| 101 | canned coffee |
| 102 | cup noodle |
| x o x | * * * |

FIG. 7B2

| Extracted item ID | Extraction rule ID | Extracted item | Character recognition result of item name (maximum likelihood candidate character string) |
|---|---|---|---|
| 1 | 1 | issuance source | (N/A) |
| 2 | 2 | issuance date | (N/A) |
| 3 | 3 | telephone number | TEL |
| 4 | 4 | total price | total |
| 5 | 5 | (product name, price) | canned coffee |
| 6 | 5 | (product name, price) | cup noodle |

FIG. 7B3

| Extracted item ID | Extraction rule ID | Extracted item | Character recognition result of item value (maximum likelihood candidate character string) | Item value |
|---|---|---|---|---|
| 1 | 1 | issuance source | Tokyo stat ion front store | Tokyo stat ion front store |
| 2 | 2 | issuance date | November 06, 2019 | Y2019,M11,D6 |
| 3 | 3 | telephone number | 03-1234-6678 | 0312346678 |
| 4 | 4 | total price | ¥360 | 360 |
| 5 | 5 | (product name, price) | canned coffee, ¥120 | canned coffee[101], 120 |
| 6 | 5 | (product name, price) | cup noodle, ¥240 | cup noodle[102], 240 |

FIG. 10A1

| Error pattern ID | Position of appearance in character string | Error pattern information | Correct pattern information | (Occurrence) frequency |
|---|---|---|---|---|
| ... | ... | ... | ... | ... |
| 101 | middle | 6 | 5 | 0.80 |
| 102 | middle | 1 | 7 | 0.70 |
| ... | ... | ... | ... | ... |
| 201 | beginning | 0 | 8 | 0.62 |
| 202 | end | 9 | 5 | 0.54 |
| ... | ... | ... | ... | ... |

FIG. 10A2

| Search key ID | Search key character string | All frequency |
|---|---|---|
| 1 | 0312346678 | 1.0 |
| 2 | 8312346678 | 1.0 |
| 3 | 0312345678 | 0.80 |
| 4 | 8312345678 | 0.80 |
| 5 | 0312345578 | 0.80 |
| 6 | 8312345578 | 0.80 |

FIG. 10A3

| Dictionary ID | Telephone number | Registered corporate name | Corporate ID | City information (ISO3166-1, ISO3166-2, city name) |
|---|---|---|---|---|
| 1 | ... | ... | ... | ... |
| 2 | 0312345578 | XX trading Co., Ltd. | 101 | JP,13,Ota ward |
| 3 | 0312345678 | MY SHOP Tokyo station front store | 102 | JP,13,Ota ward |
| 4 | 0312345680 | YY bank, ZZ branch | 103 | JP,13,Ota ward |
| 5 | ... | ... | ... | ... |

FIG. 10B1

| Search result ID | Telephone number | Registered corporate name | Corporate ID | City information (ISO3166-1, ISO3166-2, city name) | Edit distance |
|---|---|---|---|---|---|
| 1 | 0312345678 | MY SHOP Tokyo station front store | 102 | JP,13,Ota ward | 1 |
| 2 | 0312345578 | XX trading Co., Ltd. | 101 | JP,13,Ota ward | 2 |

FIG. 10B2

| Extracted item ID | Extraction rule ID | Extracted item | Character recognition result of item value (maximum likelihood candidate character string) | Item value |
|---|---|---|---|---|
| 1 | 1 | issuance source | Tokyo stat ion front store | MY SHOP Tokyo station front store |
| 2 | 2 | issuance date | November 06, 2019 | Y2019,M11,D6 |
| 3 | 3 | telephone number | 03-1234-6678 | 0312345678 |
| 4 | 4 | total price | ¥360 | 360 |
| 5 | 5 | (product name, price) | canned coffee, ¥120 | canned coffee[101], 120 |
| 6 | 5 | (product name, price) | cup noodle, ¥240 | cup noodle[102], 240 |
| 7 | 10 | issuance city information | (N/A) | JP,13,Ota ward |

FIG. 12

| Error pattern ID | Position of appearance in character string | Ruled line / Character background | Error pattern information | Correct pattern information | (Occurrence) frequency |
|---|---|---|---|---|---|
| ... | ... | ... | ... | ... | ... |
| 101 | middle | (N/A) | 6 | 5 | 0.80 |
| 102 | middle | (N/A) | 1 | 7 | 0.70 |
| 103 | middle | background color | 0 | 1 | 0.80 |
| ... | ... | ... | ... | ... | ... |
| 201 | beginning | forward | 0 | 8 | 0.62 |
| 202 | end | backward | 9 | 5 | 0.54 |
| 203 | beginning | (N/A) | 5 | 6 | 0.55 |
| ... | ... | ... | ... | ... | ... |

INFORMATION PROCESSING APPARATUS, CONTROL METHOD OF INFORMATION PROCESSING APPARATUS, AND NON-TRANSITORY STORAGE MEDIUM

BACKGROUND OF THE INVENTION

Field of the Invention

The present disclosure relates to an information processing apparatus, an information processing method, and a non-transitory storage medium for assisting data entry using a scanned image of a document.

Description of the Related Art

In recent years, image scanners installed to multi-function printers (MFP, namely, a multi-function apparatus having a printer function, a copying function, a facsimile function, and the like) or the like have been widely used. Further, digital cameras or the like installed to mobile devices represented by a compact camera or a smartphone have also been widely used. The use of such an image scanner or a digital camera has facilitated creation of a document image (a scanned document image) that is an optically scanned or captured document including handwritten characters or printed types.

Furthermore, techniques to perform a character recognition process (optical character recognition (OCR)) on such a document image to convert the document image into computer-readable character codes have been widely known and used. The use of such a character recognition process has automated work that involves conversion from a business form of a paper medium into digital data, which is represented by expense settlement work performed in general offices. Accordingly, productivity in data entry work is expected to improve.

In general, occurrence of deterioration or variation in the image quality of a document image or in the state of a character image is inevitable due to deterioration of the state of a paper medium itself, a situation of scanning or image capturing, or the like. Thus, it is extremely difficult to always obtain a correct result by using character recognition. Nonetheless, the rate of successful character recognition results has been relatively increased by improving a character recognition method or applying correction or the like via estimation of the content to an erroneously recognized character. In the present circumstances, a small number of erroneously recognized characters may often be mixed in a character recognition result.

In data entry work as described above, the user has to perform confirmation of such an entry content or correction of erroneous recognition. Thus, the extent to which erroneous recognition can be corrected when a character recognition result is corrected has a direct impact on an issue as to whether or not the technology can contribute to a reduction in a workload of the user.

Increased computation performance in a recent computer environment has made it possible to use a large number of various document images that differ in the paper medium itself, deterioration in the condition thereof, the situation of scanning or image capturing to perform more detailed quantitative measurement on an error tendency of character recognition in advance. Accordingly, correction of erroneous recognition using information on an error tendency or an error pattern of character recognition has been feasible. Furthermore, by collecting and reusing character recognition error pattern information detected in user's data entry work, it is possible to enhance the ability of correcting erroneous recognition in accordance with a user environment. Japanese Patent Application Laid-Open No. H06-195387 proposes a document search apparatus that uses character recognition error pattern information.

However, easy use of a large amount of character recognition error pattern information can lead to an increased processing time of the correction process performed thereon, and this can suppress a time saving effect which would be allowed by increased work efficiency of data entry work. Japanese Patent Application Laid-Open No. H06-195387 does not consider anything about a case where there are a large number of character recognition error patterns. Thus, an increase in the amount of character recognition error pattern information may increase (slow down) the processing time of correction of erroneous recognition using character recognition error patterns. As a result, time saving that would be achieved by an increase in user's work efficiency of data entry work may be suppressed.

SUMMARY OF THE INVENTION

In the present disclosure, provided is an information processing apparatus comprising: a memory that stores a program; and a processor that executes the program to perform: obtaining a character recognition result by performing character recognition on a document image; and applying correction using a character recognition error pattern to the obtained character recognition result, wherein the character recognition error pattern includes error pattern information on a character recognition result of a part where an error occurs in the character recognition, correct pattern information applicable to the part where the error occurs, information on a frequency that the error occurs, and information on a state where the error occurs, and wherein the character recognition error pattern to be used in the correction is narrowed down based on the information on the frequency that the error occurs and the information on the state where the error occurs.

Further features of the present invention will become apparent from the following description of exemplary embodiments with reference to the attached drawings.

BRIEF DESCRIPTION OF THE DRAWINGS

FIG. 5A is a diagram illustrating a character recognition result for the document image of FIG. 3.

FIG. 5B1 is a diagram illustrating a character recognition result for the document image of FIG. 3.

FIG. 5B2 is a diagram illustrating a character recognition result for the document image of FIG. 3.

FIG. 7A1 is a diagram illustrating an example of extracted items for the document image of FIG. 3 in a table form.

FIG. 7A2 is a diagram illustrating an example of extracted items for the document image of FIG. 3 in a table form.

FIG. 7B1 is a diagram illustrating an example of extracted items for the document image of FIG. 3 in a table form.

FIG. 7B2 is a diagram illustrating an example of extracted items for the document image of FIG. 3 in a table form.

FIG. 7B3 is a diagram illustrating an example of extracted items for the document image of FIG. 3 in a table form.

FIG. 10A1 is a diagram illustrating, in a table form, information used in the process (S407) of obtaining issuance source information from an item value of a telephone number and adding the issuance source information to the item value.

FIG. 10A2 is a diagram illustrating, in a table form, information used in the process (S407) of obtaining issuance source information from an item value of a telephone number and adding the issuance source information to the item value.

FIG. 10A3 is a diagram illustrating, in a table form, information used in the process (S407) of obtaining issuance source information from an item value of a telephone number and adding the issuance source information to the item value.

FIG. 10B1 is a diagram illustrating, in a table form, information used in the process (S407) of obtaining issuance source information from an item value of a telephone number and adding the issuance source information to the item value.

FIG. 10B2 is a diagram illustrating, in a table form, information used in the process (S407) of obtaining issuance source information from an item value of a telephone number and adding the issuance source information to the item value.

FIG. 12 is a diagram illustrating character recognition error pattern information in a table form in a second embodiment.

DESCRIPTION OF THE EMBODIMENTS

Embodiments of the present invention will be described below with reference to the drawings. Note that the embodiments are not intended to limit the present invention, and not all the features described in the embodiments are always the essential solution to achieve the object of the present invention.

First Embodiment

System Configuration

Figure 1:
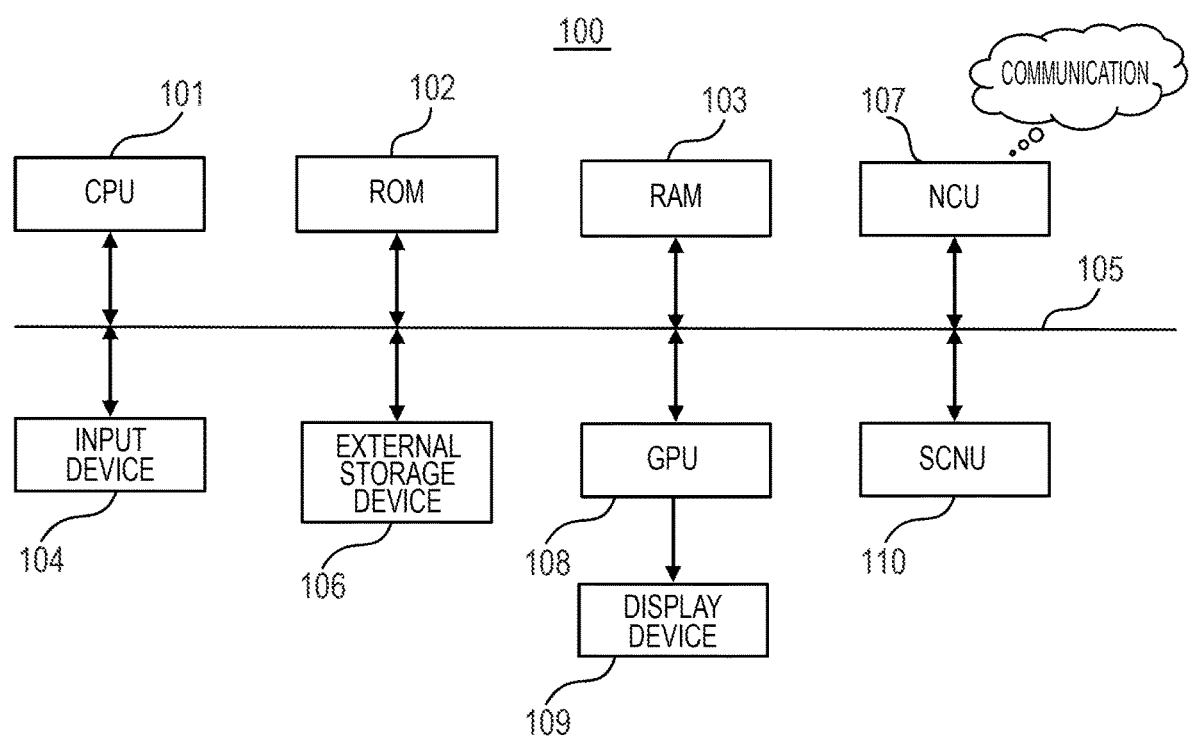
FIG. 1 is a diagram illustrating an overview of a configuration of an information processing apparatus illustrating the present embodiment.

FIG. 1 is a diagram illustrating the overview of the configuration of an information processing apparatus illustrating one embodiment of the present invention as an example. A CPU 101 is to implement control or processing of the most part of an image processing apparatus 100. Details of the operation thereof are instructed by a program in a ROM 102 or a RAM 103 described later. Further, a plurality of computer programs can be operated in parallel by the function of the CPU 101 itself or a mechanism of the computer programs.

The ROM 102 stores a computer program or data storing a procedure of control performed by the CPU 101. The RAM 103 stores a control program to be executed by the CPU 101 and provides a working area for various data used when the CPU 101 performs various control.

An input device 104 is a keyboard or a mouse that provides various user's entry operation environments, however, which may be any device such as a touch panel, a stylus pen, or the like as long as it provides various user's entry operation environments. Further, entry via the input device 104 may be entry via voice recognition, gesture recognition, or the like.

A bus 105 is an address bus, a data bus, or the like connected to respective sections of the internal configuration and provides information exchange and communication function between these sections. Respective sections can be operated in cooperation with each other by the bus 105.

An external storage device 106 stores various data or the like and is formed of a storage medium such as a hard disk, a floppy disk, an optical disk, a magnetic disk, a magnetic tape, a nonvolatile memory card, or the like, a drive that drives the storage medium and stores information, and the like. All or some of the computer programs or the data stored in the external storage device 106 are loaded into the RAM 103, when necessary, in accordance with an instruction from a keyboard or the like or an instruction from various computer programs.

An NCU 107 is a communication device for communicating with another computer apparatus or the like and enables communication with an apparatus (not illustrated) present in a remote location to share the program or data of the present embodiment via a network (LAN) or the like. The communication performed by the NCU 107 may be any communication such as wired communication using RS232C, USB, IEEE1394, P1284, SCSI, a modem, Ethernet, or the like or wireless communication using Bluetooth, infrared communication, IEEE802.11a/b/n, or the like. That is, any communication that enables communication with a device connected to the image processing apparatus 100 may be used.

A GPU 108 creates an image of a display content through calculation or calculates a display position or the like in accordance with a display instruction or a calculation instruction provided via the bus 105 in cooperation with the CPU 101 or the like and transmits the calculation result to a display device 109 for rendering the same. The calculation result may also be returned to the CPU 101 via the bus 105 to perform a calculation process in cooperation with the CPU 101.

The display device 109 is formed of a display or the like and displays the status of various input operations, calculation results in accordance therewith, or the like to the user.

An SCNU 110 is a scanner (a reading unit) that reads an original document or the like to generate image data. The SCNU 110 may be connected via a communication function of the NCU 107 or may be in a form of being connected via another dedicated external I/F.

The configuration described above is a mere example in the present embodiment, and the present invention is not particularly limited thereto. This internal configuration or a section forming the same is not limited to be so-called hardware and may be virtually created by software. Further, without being limited to the case where the internal configuration described above is used as a single entity, the embodiment may be implemented by a method of using a plurality of configurations of FIG. 1 to perform information exchange, information sharing, or the like using the NCU 107 and cause the plurality of configurations to cooperate with each other and thereby forming each system for a server, a PC client, or the like. That is, in a case of the use of a plurality of configurations, respective configurations may be present in different locations and operated in cooperation with each other via a LAN, the Internet, or the like, or a configuration virtually created by the software may be included therein. Furthermore, a usage method of sharing a configuration that operates all or some of the respective systems for a plurality of servers and PC clients or the like in the same single configuration of FIG. 1 may be employed.

Software Configuration

Figure 2:
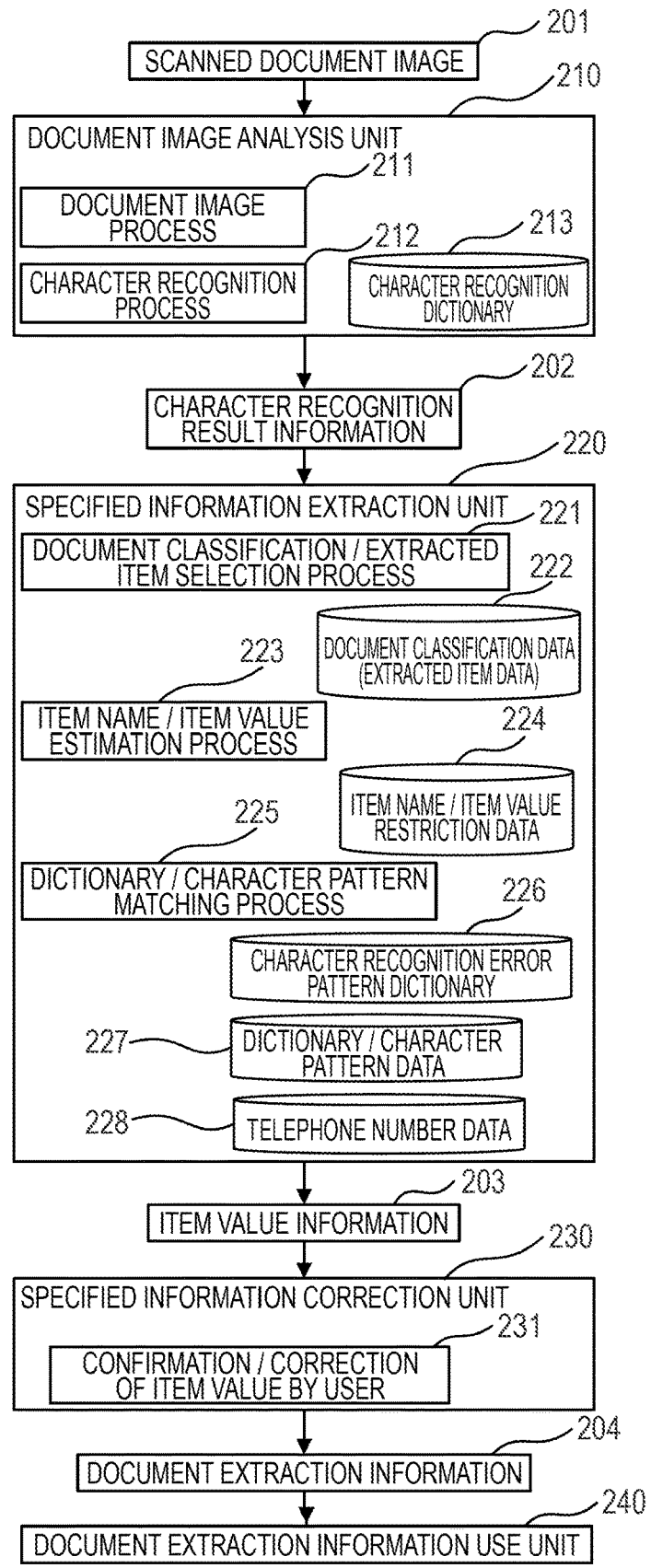
FIG. 2 is a diagram illustrating a software configuration of the information processing apparatus of the present embodiment.

FIG. 2 is a diagram illustrating an example of the software configuration of the information processing apparatus of the present embodiment and, in particular, illustrates the overview of primary functions and a flow of information according to the present embodiment.

A scanned document image 201 is image information obtained by optically scanning a document written or printed on a medium such as paper. The scanned document image 201 is acquired when a scan is performed by the SCNU 110 of FIG. 1. Basically, such information is stored in the external storage device 106 or the RAM 103 and, when stored in the external storage device 106 in use, may be copied to the RAM 103 and used.

A document image analysis unit 210 is a function section that performs an analysis process on the scanned document image 201 and extracts text information or image information, such as a picture or a photograph, written or drawn in a content as information on the content. The document image analysis unit 210 has the following functions and information.

A document image process 211 is a processing section for a function of performing adjustment of the concentration or the color of the entire image, binarization for character recognition, or deletion of a ruled-line applied image, such as a table, on the scanned document image 201 so as to facilitate analysis of a document image. Basically, this processing section is formed of a processing program or data stored in the external storage device 106 or the ROM 102 and is implemented when copied to the RAM 103 and executed and used by using the CPU 101 or the GPU 108.

A character recognition process 212 is a processing section of a function of searching a result of the document image process 211 for a character image region, obtaining a character image, and obtaining character codes corresponding to the character image. Basically, this processing section is formed of a processing program or data stored in the external storage device 106 or the ROM 102 and is implemented when copied to the RAM 103 and executed and used by using the CPU 101 or the GPU 108.

A character recognition dictionary 213 is data used for determining character codes corresponding to a character image in the character recognition process 212. Basically, such data is formed of data stored in the external storage device 106 or the ROM 102 and is used when copied to the RAM 103.

Note that the character recognition process 212 collects characters close to each other to estimate the direction of the character string and, as a character recognition result, forms a character string of the character recognition result. This character string of the character recognition result has a direction of character string description, region information on the position and the size for each character forming the character string in the scanned document image 201, and character code string information. This character code string is formed as a string of pairs of a likelihood, which is based on a similarity or the like as a character image at the time of character recognition, and a character code. In such a character code string, the maximum likelihood character code is referred to as a maximum likelihood character. Among character strings in a character recognition result, a character string formed of only one or more maximum likelihood characters is referred to as a maximum likelihood candidate character string.

Further, the character recognition process 212 can not only perform character recognition of the whole scanned document image 201 but also perform character recognition on only a part of the region within the image. Further, the character recognition process 212 can also perform character recognition when a restriction is applied to a character(s) or the type of characters, a used language, a direction of character string description, or the like in performing character recognition.

Character recognition result information 202 represents a process result provided by the document image analysis unit 210.

The character recognition result information 202 is mainly formed of a character recognition result that is output of the character recognition process 212 and an image of a process result of the document image process 211. This information is stored in the external storage device 106 or the RAM 103 and, when stored in the external storage device 106 in use, may be copied to the RAM 103 and used.

A specified information extraction unit 220 is a function section that performs an analysis process on the character recognition result information 202 and extracts required information out of the content. The specified information extraction unit 220 has the following function and information.

A document classification/extracted item selection process 221 performs document classification on the scanned document image 201 based on the content of the character recognition result information 202 (character recognition result) or the arrangement of the document image (layout). Further, the document classification/extracted item selection process 221 determines an extracted item that is an item of information to be extracted in accordance with the content of each document classification. For example, the document classification/extracted item selection process 221 classifies documents into a receipt, an invoice, a delivery note, a report, a quotation, or the like as document classification contents and determines an extracted item such as a total price, a date, or the like in accordance with the content of each document classification. Basically, this process is formed of a processing program or data stored in the external storage device 106 or the ROM 102 and is implemented when copied to the RAM 103 and executed and used by using the CPU 101 or the GPU 108.

Document classification data (extracted item data) 222 is data used by the document classification/extracted item selection process 221 to perform document classification. This data stores information about a content of each document classification and arrangement of the document image (layout) and information on an extracted item determined by the content of each document classification. This information is stored in the external storage device 106 or the RAM 103 and, when stored in the external storage device 106 in use, may be copied to the RAM 103 and used.

An item name/item value estimation process 223 searches character recognition results of the character recognition result information 202 for a character recognition result which is considered to actually correspond to an item value for an extracted item and performs allocation. Basically, this process is formed of a processing program or data stored in the external storage device 106 or the ROM 102 and is implemented when copied to the RAM 103 and executed and used by using the CPU 101 or the GPU 108.

Item name/item value restriction data 224 is information about a restriction in performing a search in the item name/item value estimation process 223. This information records a restriction on a character recognition result of a character type, a term, or the like for an item name or an item value, as a restriction on the item name or the item value or a restriction on an absolute or relative position (arrangement) or the like in a document image. This information is stored in the external storage device 106 or the RAM 103 and, when stored in the external storage device 106 in use, may be copied to the RAM 103 and used.

A dictionary/character pattern matching process 225 uses a character recognition error pattern dictionary 226 and a dictionary/character pattern data 227 to correct a character recognition result of an item value as much as possible. Further, for a character recognition result of a telephone number out of character recognition results of an item value, the character recognition error pattern dictionary 226 and telephone number data 228 are used to obtain information such as a name of a company, a shop, or the like having the telephone number or an area name thereof and add the obtained information to the item value. Basically, this process is formed of a processing program or data stored in the external storage device 106 or the ROM 102 and is implemented when copied to the RAM 103 and executed and used by using the CPU 101 or the GPU 108.

Since a character recognition result is affected by deterioration of the scanned document image 201 or the original paper document itself, an environment at the time of a scan, or the like, it is extremely difficult to realize an error-free condition. If there is an error in the character recognition result, however, it will be difficult to reuse information extracted from the scanned document image 201. Thus, the dictionary/character pattern matching process 225 corrects a character recognition result as much as possible to improve the accuracy in the character recognition result of an item value. However, it is still extremely difficult to realize a completely error-free condition, and this results in a condition where errors may be mixed even though errors are reduced.

The character recognition error pattern dictionary 226 represents information on a typical error pattern of character recognition. This information is information that has been created in advance by causing the character recognition process 212 to perform character recognition with various sample data and comparing character recognition results with correct results for the sample data. This information is stored in the external storage device 106 or the RAM 103 and, when stored in the external storage device 106 in use, may be copied to the RAM 103 and used.

The dictionary/character pattern data 227 represents information used for correcting an item value of an item to be extracted. When the content (character string) of an item value is known in advance or can be expected, a dictionary about the content is created in advance. The dictionary/character pattern data 227 represents information corresponding to a dictionary created in such a way. The dictionary/character pattern matching process 225 uses the dictionary/character pattern data 227 to estimate a content corresponding to a character recognition result. This information is stored in the external storage device 106 or the RAM 103 and, when stored in the external storage device 106 in use, may be copied to the RAM 103 and used.

The telephone number data 228 is data in which information such as a name of a company, a shop, or the like having the telephone number or the area name thereof is associated with a telephone number. This information is created in advance, then stored in the external storage device 106 or the RAM 103, and when stored in the external storage device 106 in use, may be copied to the RAM 103 and used.

Item value information 203 represents a value of an item value for each item extracted by the specified information extraction unit 220. This information is stored in the external storage device 106 or the RAM 103 and, when stored in the external storage device 106 in use, may be copied to the RAM 103 and used.

A specified information correction unit 230 causes the user to confirm the content of the item value information 203 or correct an error thereof and acquires a correct value for an item value. The specified information correction unit 230 has the following function and information.

Confirmation/correction of item value by user 231 is a section to present the content of the item value information 203 to the user for confirmation of an item value or correction of an error. Accordingly, a correct value of an item value is acquired. This process is formed of a processing program or data stored in the external storage device 106 or the ROM 102 and is implemented when copied to the RAM 103 and executed and used by using the CPU 101 or the GPU 108.

Document extraction information 204 is correct item value information to be extracted obtained by the confirmation/correction of item value by user 231. This information is stored in the external storage device 106 or the RAM 103 and, when stored in the external storage device 106 in use, may be copied to the RAM 103 and used.

A document extraction information use unit 240 is a device, an application, a service, or the like that use the document extraction information 204. There are various types of the document extraction information use unit 240, and the present invention is applicable to any of those using the document extraction information 204.

Each of the functions and the process flows described above is a mere example in the present embodiment, and the present invention is not particularly limited thereto. In particular, a plurality of devices may share the functions described above, or a single process may be distributed to a plurality of devices.

Example of Document

Figure 3:
FIG. 3 is a diagram illustrating a document image illustrating a process of the present embodiment.

FIG. 3 is a diagram illustrating an example of a document image illustrating a process of the present embodiment.

A business form document 300 is an example of a document image of a receipt. The business form document 300 includes the followings as the written or drawn part in the present document.

A receipt issuance source 301 is a written or drawn part of a name of a company, a shop, or the like that has issued the present document and is expressed by a logo or the like. Similarly, as the written or drawn part included in the business form document 300, there are descriptions of a store name 302 of the issuance source, a telephone number 303 of the issuance source, an issuance date 304, a product name "canned coffee" and the price 305 thereof, and a total price 306 for the purchase of the product.

Since names of issuance sources expressed by a logo or the like differ in the character shape or design from typical printed characters as with the receipt issuance source 301, there is a tendency of correct character recognition being difficult in a character recognition process. Far from correct character recognition, names of issuance sources may often be expressed in an image such as a figure, and in such a case, such a name is originally not a target of a character recognition process. Further, a content written by characters may be an abbreviation or a nickname instead of a formal name of an issuance source. Thus, in a case of such a receipt, an issuance source may often be unable to be obtained by character recognition.

Furthermore, it may be necessary to identify a place such as a city name where the purchase was made because of requirements in performing a process of taxes or the like. There may be no description corresponding to the address of an issuance source, and there may be many companies, shops, or the like having many branch stores. In such a case, there may often be a description of the store name 302 of an issuance source, however, which is not a description such as an address. Thus, such a description does not often help identification of a city name.

To address such a case, there is a method of performing a search on telephone number data such as a telephone directory based on a character recognition result of the telephone number 303 to obtain issuance source information such as a name, a place, or the like of an issuance source. In general, with respect to information on names, addresses, or the like of companies, store names of shops, or the like, telephone numbers thereof are recorded in association therewith in the telephone number data. This is used to obtain issuance source information such as a name, a place or the like of an issuance source.

Overall Process Flow

Figure 4:
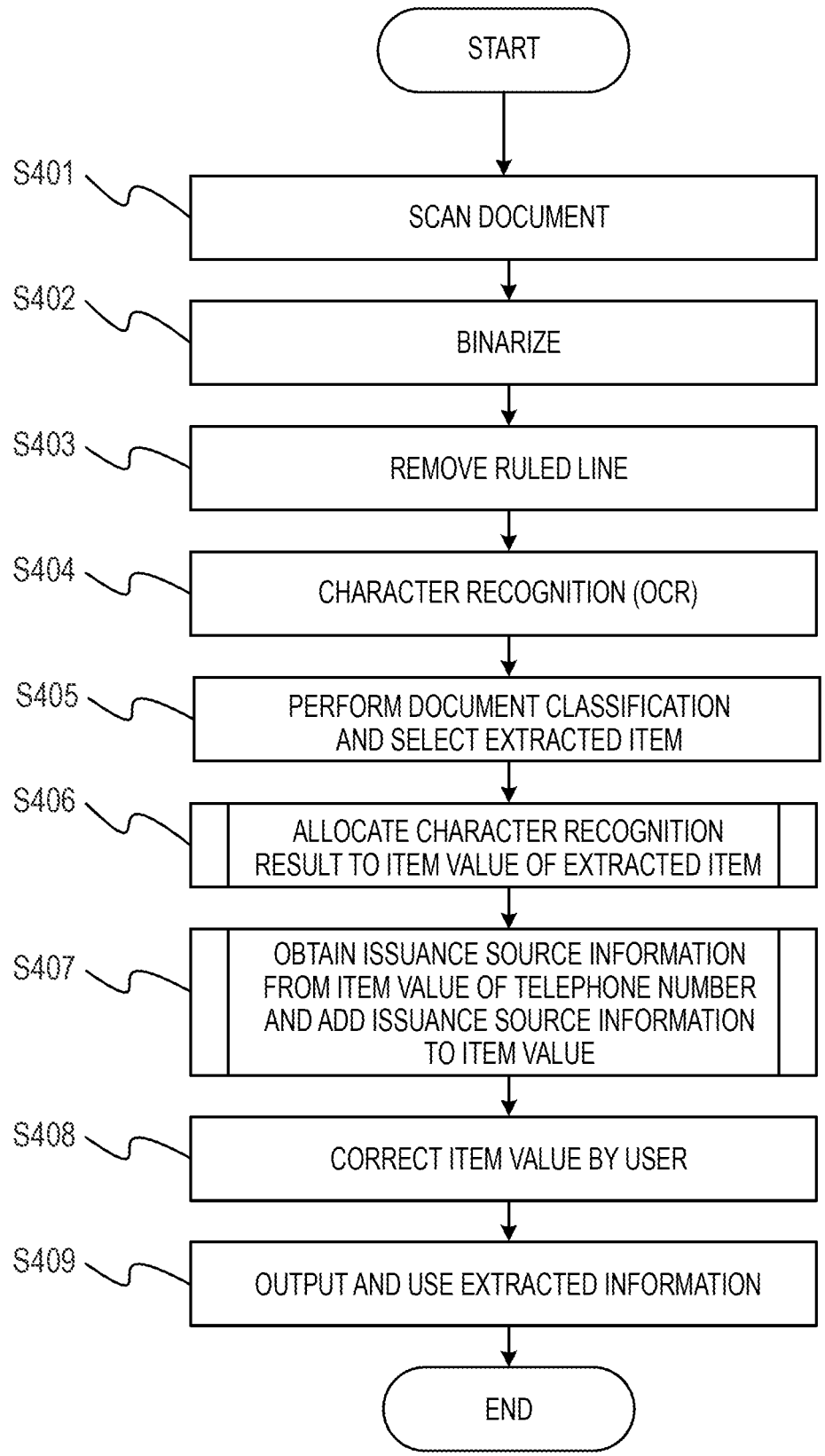
FIG. 4 is a flowchart illustrating the overall process of an image processing apparatus of the present embodiment.

FIG. 4 is a flowchart illustrating an example of the overall process of the image processing apparatus 100 of the first embodiment. The process of this flowchart is implemented when a process program stored in the external storage device 106 or the ROM 102 is copied to the RAM 103 and executed and used by using the CPU 101 or the GPU 108.

In S401, the CPU 101 uses the SCNU 110 to scan a document. Accordingly, the scanned document image 201 of FIG. 2 is acquired.

Next, in S402, the CPU 101 performs a binarization process. The CPU 101 creates an image binarized from the scanned document image 201 in accordance with the document image process 211 of FIG. 2.

Next, in S403, the CPU 101 is a section to perform a process of removing a ruled line. The CPU 101 detects a ruled line from the image (binarized image), which is the process result of S402 described above, in accordance with the document image process 211 of FIG. 2 and creates an image in which removal treatment is performed on an image part corresponding to the detected ruled line.

Next, in S404, the CPU 101 performs a process of character recognition. The CPU 101 performs a character recognition (OCR) process on the image of the process result of S403 described above in accordance with the character recognition process 212 of FIG. 2. The character recognition result information 202 is created from the above character recognition result, each image of the above process, and the scanned document image 201. Details of this process will be described later with an example of the document of FIG. 3 and an example of character recognition results of FIG. 5A, FIG. 5B1, and FIG. 5B2.

Next, in S405, the CPU 101 performs document classification and performs a selection process for an item to be extracted. The CPU 101 uses the document classification data 222, performs document classification on the character recognition result information 202, and selects an extracted item based on a document classification result in accordance with the document classification/extracted item selection process 221 of FIG. 2. Note that an example of extracted items selected when a document is classified as "receipt" as a result of document classification is illustrated in FIG. 7A1 described later.

Next, in S406, the CPU 101 allocates the character recognition result to item values of all the extracted items. The CPU 101 searches the character recognition result of S404 described above for a part corresponding to the extracted item of the process result of S405 described above and performs allocation of the character recognition result corresponding to the item value of the part in accordance with the item name/item value estimation process 223 of FIG. 2. In this operation, correction on the character recognition result allocated to the item value is also applied. The CPU 101 applies correction of the character recognition result to the character recognition result allocated by S406 in accordance with the dictionary/character pattern matching process 225 of FIG. 2. Details of this process will be described later with reference to the example of the document of FIG. 3, a flowchart of FIG. 6, and tables of FIG. 7A1, FIG. 7A2, FIG. 7B1, FIG. 7B2, and FIG. 7B3.

Next, in S407, the CPU 101 uses the telephone number data 228 of FIG. 2 to perform a process of obtaining issuance source information from the item value of the telephone number and adding the obtained issuance source information to the item value. Details of this process will be described later with reference to the example of the document of FIG. 3, flowcharts of FIG. 8 and FIG. 9, and tables of FIGS. 10A1, 10A2, 10A3, 10B1, and FIG. 10B2.

Next, in S408, the CPU 101 extracts character recognition error pattern information based on correction on the item value performed by the user and the detail of the correction and registers the character recognition error pattern information to be made available. The CPU 101 presents, to the user, the character recognition result of all the item values corrected by S407 described above in a screen as with FIG. 11 described later, for example, and receives confirmation or correction of the content thereof in accordance with the confirmation/correction of item value by user 231 of FIG. 2. Furthermore, the CPU 101 extracts character recognition error pattern information based on the detail of the correction and registers the character recognition error pattern information to be made available.

Next, in S409, the CPU 101 outputs information extracted by the process of S401 to S408 described above and processes this information to be made available. The CPU 101 creates and passes the document extraction information 204 of FIG. 2 to the document extraction information use unit 240 by using the specified information correction unit 230 to facilitate the use thereof. In response to completion of the process of S409, the CPU 101 ends the process of the present flowchart.

FIGS. 5A to 5B2 are diagrams illustrating examples of a character recognition result for the document image of FIG. 3.

FIG. 5A is a diagram illustrating a character recognition result for the document image of FIG. 3 in a table form and corresponds to a process result in S404 of FIG. 4.

The character recognition results are managed on a character string basis, character recognition result IDs are provided as identification numbers thereof, and a particular character recognition result can be identified. This is represented as "Character recognition result ID" of FIG. 5A.

Each character recognition result has information on the position and the size in the document image thereof, and the position coordinates and the size are filled in and partitioned by "-". Further, each character recognition result has a character code and position and coordinate information for each character image forming the document image. In FIG. 5A, the position coordinates and the size are filled in and partitioned by "-" in the field of "Position-size in document image".

Further, each character recognition result has a character code and position and coordinate information (not illustrated) for each character image forming the character recognition result, and the character code has the maximum likelihood candidate to a lower-level candidate thereof. In FIG. 5A, character codes of the maximum likelihood candidate of each character recognition result are represented as a character string in the field of "Character recognition result (maximum likelihood candidate character string)". Note that the lower-level candidate will be described later. Note that, although it is possible to give a restriction on a character(s) or the type of characters, a used language, a direction of character string description, or the like in performing character recognition, no restriction is given here in particular, and the character recognition restriction to be used defines that all the character types can be used.

Specific Example of Character Recognition Result

A specific example of a character recognition result will be described below.

In FIG. 5A, the character recognition result ID "1" corresponds to the character recognition result of 302 in FIG. 3. In the following, the character recognition result IDs "10" and "11" correspond to the character recognition result of 303 in FIG. 3, the character recognition result ID "20" corresponds to the character recognition result of 304 in FIG. 3, and the character recognition result IDs "30" and "31" correspond to the character recognition results of 306 in FIG. 3.

Each character recognition result is a result occurring after the process of S404 of FIG. 4 has been performed in accordance with the character recognition process 212 of FIG. 2 and includes errors. The errors in the character recognition will be described below with reference to FIG. 5B1 and FIG. 5B2.

FIG. 5B1 and FIG. 5B2 each illustrate examples including one or more lower-level candidates for a character recognition result and illustrate the information structure of the character recognition result.

FIG. 5B1 corresponds to a character recognition result of the character recognition result ID "1".

Reference 511 represents a mark indicating a start point of a character recognition result, and reference 512 represents a mark indicating an end point. A sequence of the character recognition result is described between the start point 511 and the end point 512. The arrow 513 indicates the flow of a character string, and reference 514 indicates a character string of characters of the maximum likelihood candidate of the character recognition result, that is, the maximum likelihood candidate character string. References 521 to 527 indicate characters of character codes of the character image.

It should be noted that the field of "Character recognition result" of FIG. 5A is filled in accordance with the maximum likelihood candidate character string. Further, in the field of "Character recognition result" of FIG. 5A, cases where characters of the maximum likelihood candidate are characters that do not match the result illustrated in FIG. 3 are emphasized by bold characters. Specifically, in the character recognition result of the character recognition result ID "1", the character of "station" of 301 in FIG. 3 is recognized as characters of "stat" and "ion", and this is because these characters are allocated as 523 and 524 in FIG. 5B1.

Further, a lower-level candidate character of each character in the maximum likelihood candidate character string 514 (a candidate character other than the maximum likelihood character of each character) is indicated under the maximum likelihood candidate character thereof, and there is a case where the number of characters in a maximum likelihood candidate does not match the number of characters in a lower-level candidate. FIG. 5B1 indicates that there is a candidate character 527 as a lower-level candidate character for the maximum likelihood candidate characters 523 and 524. That is, it is illustrated that "station" is present as a lower-level candidate character for the maximum likelihood candidate characters "stat" and "ion".

FIG. 5B2 corresponds to a character recognition result of the character recognition result ID "11".

Reference 531 represents a mark indicating a start point of a character recognition result, and reference 532 represents a mark indicating an end point. A sequence of the character recognition result is described between the start point 531 and the end point 532. The arrow 533 indicates the flow of a character string, and reference 534 indicates a character string of characters of the maximum likelihood candidate of the character recognition result, that is, the maximum likelihood candidate character string. References 541 to 563 indicate characters of character codes for the character image. The characters in 534 (541 to 552) indicate the maximum likelihood candidate character string. With respect to lower-level candidate characters, the lower-level candidate for the maximum likelihood candidate 541 is the character 553. Similarly, the lower-level candidate for the maximum likelihood candidate 543 is the character 554, the lower-level candidates for the maximum likelihood candidate 544 are the characters 555 and 556, the lower-level candidate for the maximum likelihood candidate 545 is the character 557, and the lower-level candidate for the maximum likelihood candidate 547 is the character 558. Further, the lower-level candidate for the maximum likelihood candidate 548 is the character 559, the lower-level candidate for the maximum likelihood candidate 549 is the character 560, the lower-level candidate for the maximum likelihood candidate 550 is the character 561, the lower-level candidate for the maximum likelihood candidate 551 is the character 562, and the lower-level candidate for the maximum likelihood candidate 552 is the character 563.

Item Value Extraction Flow

Figure 6:
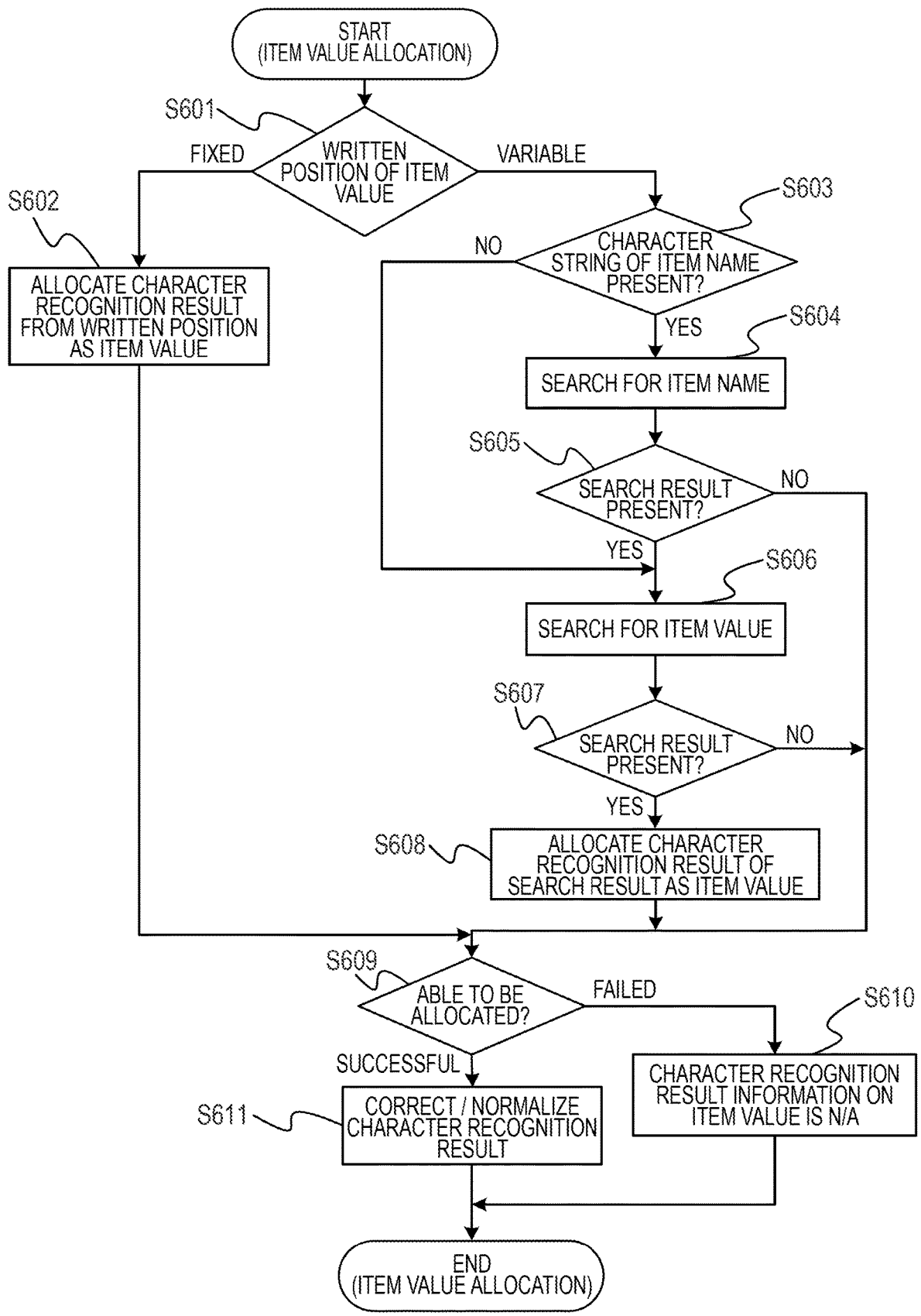
FIG. 6 is a flowchart illustrating a character recognition result allocation process (S406) for an extracted item value.

FIG. 6 is a flowchart illustrating an example of a character recognition result allocation process to an extracted item value indicated in S406 of FIG. 4 and corresponds to a process of allocating a character recognition result to item values of respective items extracted in S405 of FIG. 4. As a result of the process of this flowchart, a character recognition result that represents item values of respective extracted items is specified. The process of the flowchart is performed on the item values of all the items extracted in S406, and thereby character recognition information on the item values of all the extracted items will be obtained. Note that the process of the flowchart is implemented when a process program stored in the external storage device 106 or the ROM 102 is copied to the RAM 103 and executed and used by using the CPU 101 or the GPU 108.

In S601, the CPU 101 determines whether the information on the written or drawn position of an item value of an extracted item to be processed is "fixed" or "variable". The information on the item selected from a document classification result of S405 of FIG. 4 includes information on the written or drawn position of the item value of each item, and the CPU 101 uses this information to determine whether the information on the written or drawn position of the item value is "fixed" or "variable". For example, when "receipt" is obtained as a result of the document classification of S405 and FIG. 7A1 is obtained as an extracted item, and when the extracted item to be processed is "issuance source", the written or drawn position of the item value will be "fixed". Further, when the extracted item to be processed is "issuance date", "telephone number", "total price", or "(product name, price)", the written or drawn position of the item value will be "variable".

If the written or drawn position of the item value is "fixed", this means that the written or drawn position of the item value is within a fixed range, and the CPU 101 proceeds with the process to S602. In contrast, in a case of "variable", the position of the item value is undefined, and the CPU 101 proceeds with the process to S603.

In S602, since the written or drawn position of the item value is within a fixed range in this case, the CPU 101 allocates the character recognition result from the written or drawn position as an item value. Since the written or drawn position of the item value is within the fixed range, the CPU 101 searches the character recognition result within the range and allocates the search result, if any, as an item value. For example, as illustrated in FIG. 7B3, the item value "Tokyo stat ion front store" is allocated to the extracted item "issuance source". In response to completion of the process of S602, the CPU 101 proceeds with the process to S606.

In S603, since the position of the item value is undefined in this case, the CPU 101 determines whether or not there is designation of a character string of an item name in the information on the item selected from the document classification result in S405 of FIG. 4. In the example of FIG. 7A1, if the extracted item is "issuance date", the character string of the item name is determined as "No (not present)", and if the extracted item is "telephone number", "total price", or "(product name, price)", the character string of the item name is determined as "Yes (present)".

If there is designation of a character string of the item name (S603, "Yes"), the CPU 101 proceeds with the process to S604. In contrast, if there is no designation of a character string of the item name (S603, "No"), the CPU 101 proceeds with the process to S606.

In S604, the CPU 101 performs an item name search. The CPU 101 searches for a character recognition result identical or similar thereto in accordance with the designation of the character string of the item name confirmed in S603 described above and proceeds with the process to S605. For example, as illustrated in FIG. 7B2, the item name "TEL" is acquired as a search result for the extracted item "telephone number". Note that, when the character string of the item name is a dictionary name included in the dictionary/character pattern data 227 of FIG. 2, such as "[product name dictionary]" of the extracted item "(product name, price)", a dictionary is used for the search in S604, and a product name in "product name dictionary" of FIG. 7B1 is acquired as a search result.

In S605, the CPU 101 determines whether or not an identical or similar character recognition result is present as a result of the item name search of S604 described above. If the identical or similar character recognition result is present (S605, "Yes"), the CPU 101 proceeds with the process to S606. In contrast, if no identical or similar character recognition result is present (S605, "No"), the CPU 101 proceeds with the process to S609.

In S606, since there is a restriction on the item value in the information on the item selected from the document classification result in S405 of FIG. 4, the CPU 101 searches for the item value in accordance with the restriction. The item value search of S606 will be described below in detail.

First, if "restriction on character string patterns" is present in the restriction on the item value included in the information on the item selected from the document classification result in S405 of FIG. 4, the CPU 101 searches for a character recognition result which meets this character string pattern restriction to set a candidate. For example, in a case of the extracted item name "issuance date" of FIG. 7A1, a character string pattern "DATE type" of the item value is used as the character string pattern restriction for the search. In a case of "telephone number", a character string pattern "TEL type" is used as the character string pattern restriction for the search. In a case of "total price" and "(product name, price)", a character string pattern "MONEY type" is used as the character string pattern restriction for the search. In contrast, if no "restriction on character string patterns" is present in the restriction on the item value, all the character recognition results are searched to set a candidate. In practice, since an OCR error is included, the CPU 101 will search for a character recognition result which will most conform with a restriction on a character string pattern while using the character recognition error pattern dictionary 226 or the dictionary/character pattern data 227 of FIG. 2 so that the searched result is as close as possible to a case where the restriction on the character string pattern would be applied.

Next, if "restriction on a relative position relative to a search result of an item name" is designated for the information on the item selected from the document classification result in S405 of FIG. 4, the CPU 101 uses the item name search result of S604 for the character recognition result set as a candidate to search for the item value. As a relative positional relationship, the CPU 101 searches for a character recognition result which is located at a corresponding position when viewed from the position in the document image of the character recognition result that is the search result of S604. Since a plurality of restrictions may be designated in the information in the relative direction of the item value relative to the position of the item name, searches are performed from the beginning with priority in such a case, and an applicable character recognition result, if any, will be a prioritized candidate. For example, in the case of the extracted item names "telephone number", "total price", or "(product name, price)" of FIG. 7A1, the character recognition result located on the "right" of the item name is searched for.

The description of S606 ends here. In response to the completion of the process of S606, the CPU 101 proceeds with the process to S607.

In S607, the CPU 101 determines whether or not a character recognition result is present as a search result of the item value of S606 described above. If a character recognition result is present as a search result (S607, "Yes"), the CPU 101 proceeds with the process to S608. In contrast, if no character recognition result is present as a search result (S607, "No"), the CPU 101 proceeds with the process to S609.

In S608, since a character recognition result is present as a search result, the CPU 101 allocates the character recognition result of the search result as an item value. For example, as illustrated in FIG. 7B3, the CPU 101 allocates the character recognition result "Nov. 6, 2019" to the extracted item "issuance date", "03-1234-6678" to "telephone number", "¥360" to "total price", and the like. In response to completion of the process of S608, the CPU 101 proceeds with the process to S609.

In S609, the CPU 101 determines whether or not allocation of the item value is successful. If the allocation of the item value failed (S609, "Failed"), the CPU 101 proceeds with the process to S610.

In S610, since the allocation of the item value failed, the CPU 101 sets the character recognition result information applicable to the item value to "N/A" and ends the process of the present flowchart.

In contrast, if the allocation of item values is successful (S609, "Successful"), the CPU 101 proceeds with the process to S611.

In S611, since the allocation of the item value is successful, the CPU 101 applies correction or normalization of the character string of the item value or interpretation of the value to the allocated character recognition result information while taking mixture of an OCR error into consideration. Accordingly, the value of the item value for the extracted item of S406 of FIG. 4 is determined and stored as a result. For example, in accordance with normalization and interpretation information for each character string pattern of FIG. 7A2, the character recognition result "Nov. 6, 2019" is normalized to "Y2019, M11, D6" as illustrated in FIG. 7B3. Further, "03-1234-6678" is normalized to "0312346678", and "¥360" is normalized to "360". In response to completion of the process of S611, the CPU 101 ends the process of the present flowchart. The process described above is performed on all the extracted items of S406 of FIG. 4, thereby values of the item values of all the extracted items are determined and stored as a result.

Example of Item Value Extraction

FIGS. 7A1 to 7B3 are diagrams illustrating an example of the extracted item for the document image of FIG. 3 in a table form.

An example of results of the process of S405 and S406 of FIG. 4 and the process of FIG. 6 will be described below with reference to FIGS. 7A1 to 7B3.

It is assumed that, once the process of S405 of FIG. 4 is performed on the character recognition result (FIG. 5A) obtained from the document image of FIG. 3, "receipt" is obtained as a result of document classification, and FIG. 7A1 is obtained as the extracted item to be extracted in such a case.

Each extracted item has "extracted item ID" for identification thereof. Each extracted item basically has an item value that is a value to be extracted, and such an item value is written in a document image. Thus, a content corresponding to an item value is supposed to be obtained as a character recognition result. In some business forms, however, no item value for an extracted item may be written, or even when the item value is written, a character recognition result corresponding thereto may include an error. Thus, the process of S406 of FIG. 4 (that is, the process of FIG. 6) will be performed in accordance with the dictionary/character pattern matching process 225.

In FIG. 7A1, the extracted item has information about the position in which the item value is written as a position of an item value. This information on the position is "fixed" or "variable".

If the information on the position is "fixed", information on a particular fixed position or range in a document image is designated as the position of the item value, and "uppermost level" is designated for the extraction rule ID "1". In such a case, the process will be performed with S602 of FIG. 6. Note that, in such a case, neither information on "Character string of item name" nor information on "Relative position of item name relative to position of item name" is provided.

In contrast, if the information on the position is "variable", no information on the position in which the item value is written is provided. Instead, information on "Character string of item name" and information on "Relative position of item name relative to position of item name" are provided. In general, when an item value for an extracted item is written, the item name is written in order to provide for a case where it is necessary to specify of what the item value is.

Note that "[product name dictionary]" of "Character string of item name" for the extraction rule ID "5" indicates to use "product name dictionary" in the dictionary/character pattern data 227 of FIG. 2 to search for an applicable product name out of product names registered therein. In practice, since recognition of figure and character includes an error, a lower-level candidate of character recognition or the character recognition error pattern dictionary of FIG. 2 is used. An example of the product name dictionary is illustrated in FIG. 7B1. This dictionary is used to perform a search for a character string of a character recognition result that is very similar to the character string of the product name in "Character string of item value" or "product name dictionary" by using dynamic programming, Viterbi algorithm, or the like in S604 of FIG. 6.

Further, information on "Character string pattern of item value" is provided as a restriction on the character string for the item value. A character string representing an item value is required to meet this restriction, which is also used as a condition in a search. With the use of the above, the process of S608 of FIG. 6 is to search the character recognition result applicable to the item value. In practice, since recognition of figure and character includes an error, a lower-level candidate of character recognition or the character recognition error pattern dictionary of FIG. 2 is used, and dynamic programming, Viterbi algorithm, or the like may be used in S608 of FIG. 6. With such usage, searching for a character string of a character recognition result that is very similar to "Character string pattern of item value" is performed. Note that, if the "position of item name" is "fixed", since neither information on "Character string of item name" nor information on "Relative position of item name relative to position of item name" is provided, "N/A" is filled therein.

FIG. 7A2 lists the detail of "Character string pattern of item name" in FIG. 7A1 as extraction restrictions. Each extraction restriction has "Extraction restriction ID" for identification, and each extraction restriction ID has "Character string pattern" and "Normalization/interpretation information". The "Character string pattern" is indicated in normalized representation, there are "DATE type" as a character string pattern for description of a date, "TEL type" as a character string pattern of describing a telephone number, and "MONEY type" as a character string pattern of describing a price, and "Extraction restriction ID" is set for each character string pattern. These "DATE type", "TEL type", and "MONEY type" are designated in "Character string pattern of item value" of FIG. 7A1. The "Normalization/interpretation information" lists data forms for extraction as the final item value. Although no detailed content is depicted, it is instructed that a general character string of a date, a telephone number, a price, or the like be interpreted as a character string, an integer, or the like.

FIG. 7B1 illustrates an example of the product name dictionary, which is formed of product names and product IDs of respective products. In practice, for a faster search for a product name, various pieces of search index information (not illustrated) are often added.

FIG. 7B2 illustrates, in a table form as an example, a process result when the process of S604 of FIG. 6 has been performed on a character recognition result (FIG. 5A) obtained for the example of the document image of FIG. 3. To identify the extracted content for each individual extracted result, "Extracted item ID" is provided, and "Extraction rule ID" ("Extraction rule ID" in FIG. 7A1) used for the extraction is listed.

The extracted item IDs "1" and "2" correspond to a case where "Position of item name" is "fixed" or "Character string of item name" is not designated in FIG. 7A1 (the extraction rule IDs "1" and "2"), and "(N/A)" is filled for "Character recognition result of item name".

The extracted item IDs "3" and "4" correspond to a case where "Position of item value" is "variable" and "Character string of item value" is designated in FIG. 5A (the extraction rule IDs "3" and "4") in FIG. 5A. Those applicable to "Character string of item name" of the extraction rules IDs "3" and "4" are searched for, and the searched results are as listed for "Character recognition result of item name".

The extracted item IDs "5" and "6" correspond to a case where "Position of item name" is "variable" and use of "product name dictionary" as "Character string of item value" is designated (the extraction rule ID "5"). Those applicable to a product name registered in "product name dictionary" (in the dictionary/character pattern data 227 of FIG. 2) designated in the extraction rule ID "5" are searched for, and the searched results are as listed for "Character recognition result of item name".

FIG. 7B3 illustrates, in a table form as an example, a process result after the process of S602 and S603 to S608 of FIG. 6 has been performed on a character recognition result (FIG. 5A) obtained for the example of the document image of FIG. 3.

Character recognition results which have been searched for as item values are listed in the field of "Character recognition result of item value" for each extracted item. Note that the extracted item ID "1" corresponds to a character recognition result which has been searched for in S602 of FIG. 6 based on a position restriction indicating that the position is "fixed" and "uppermost" for the extraction rule ID "1" of FIG. 7A1. The extracted item ID "2" corresponds to a character recognition result which has been searched for in S606 so as to match "DATE type" that is a character string pattern of FIG. 7A2. The extracted item IDs "3" and "4" use "Character recognition result of item name" of FIG. 7B1 obtained in S604. This use causes "Relative direction of item value relative to position of item name" of FIG. 7A1 and "TEL type" and "MONEY type", which are the character string patterns in FIG. 7A2, to form the character recognition result which has been searched for in S606. The extracted item IDs "5" and "6" use "Character recognition result of item name" that is the product name in "product name dictionary" of FIG. 7B1 obtained in S604. This use causes "Relative direction of item value relative to position of item name" of FIG. 7A1 and "MONEY type", which is the character string patterns in FIG. 7A2, to form the character recognition result which has been searched for in S606.

In response, in S611 of FIG. 6, an item value is determined based on "Normalization/interpretation information" of FIG. 7A2 for "Character recognition result of item value". For the extracted item ID "1," since no designation of "Character string pattern of item value" is provided, the maximum likelihood character string of the character recognition result is directly used as the item value. For the extracted item ID "2", in accordance with "DATE type" of FIG. 7A2, the value is divided into three parts, namely, a year part, a month part, and a date part. Results having only numerals are thus created including the lower-level candidate of the character recognition result, and the numerals are then individually made into integers, which results in three integer item values of year (Y), month (M), and date (D).

Further, similarly, the extracted item ID "3" represents a numeric character string as "TEL type", which is a result formed of only numerals including the lower-level candidate of the character recognition result. The extracted items IDs "4" to "6" each represent an item value that is a combination of a product name including a product ID based on the product name dictionary and an integer price value, which is obtained by changing a form of the part corresponding to the price of "MONEY type" including a lower-level candidate of the character recognition result into a result formed of only numerals and making the result into integers.

Telephone Number Search Flow

Figure 8:
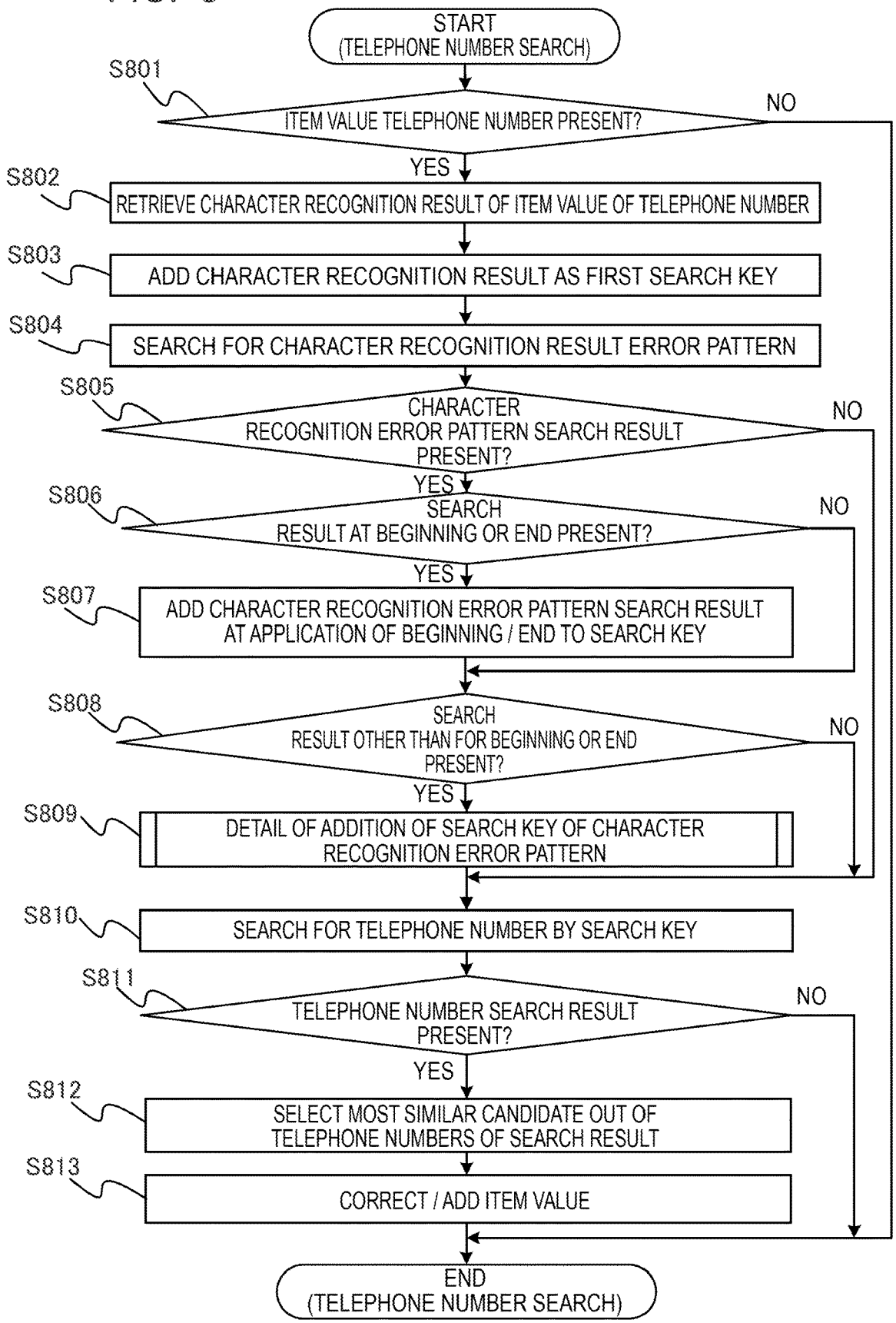
FIG. 8 is a flowchart illustrating a process (S407) of obtaining issuance source information from an item value of a telephone number and adding the issuance source information to the item value.

FIG. 8 is a flowchart illustrating a detailed flow of a process of obtaining issuance source information from an item value of the telephone number illustrated in S407 of FIG. 4 and adding the issuance source information to the item value, and this process is performed on all the item values allocated with the character recognition result in S406. As a result of this process, item values of the issuance source, a city name, and a telephone number for the extracted item will be added or corrected. This process is performed in the dictionary/character pattern matching process 225 of FIG. 2. That is, the process of the flowchart is implemented when a process program stored in the external storage device 106 or the ROM 102 is copied to the RAM 103 and executed and used by using the CPU 101 or the GPU 108.

In S801, the CPU 101 determines whether or not a telephone number is obtained as an item value for an extracted item to be processed. For example, if the process result of S406 is as illustrated in FIG. 7B3, a telephone number is obtained as an item value for the extracted item "telephone number", and no telephone number is obtained for other extracted items. If no item value of a telephone number is obtained in S406 of FIG. 4 (S801, "No"), the CPU 101 ends the process of the present flowchart. In contrast, if an item value of a telephone number is obtained (S801, "Yes"), the CPU 101 proceeds with the process to S802.

In S802, the CPU 101 retrieves out a character recognition result that is the item value of the telephone number obtained in S406 of FIG. 4. The character recognition result as used herein is a character recognition result as illustrated in FIG. 5B2 as an example.

Next, in S803, the CPU 101 registers, as a first search key, a character string with the maximum likelihood candidate characters of the character recognition result obtained in S802 described above. The search key is a set of search key character strings used for performing telephone number searches and is initialized in this step, and the maximum likelihood candidate characters of the character recognition result obtained in S802 described above are registered. For example, as with the search key ID "1" of FIG. 10A2, "0312346678" is registered as a search key.

Next, in S804, the CPU 101 performs a search on the character recognition error pattern dictionary 226 of FIG. 2 (for example, FIG. 10A1) by using, as search conditions, the character and the position thereof in the maximum likelihood candidate characters of the character recognition result obtained in S802 described above. It is thus possible to obtain information on a character recognition error pattern applicable to the character string of the maximum likelihood candidate characters described previously and a correct character applicable to an error thereof and a (occurrence) frequency thereof.

Next, in S805, the CPU 101 determines whether or not information on a character recognition error pattern applicable to the character string of the maximum likelihood candidate characters described previously and a correct character applicable to an error thereof are obtained as the search result of S804 described above. For example, it is assumed that information on the error pattern ID "101" or the error pattern ID "201" of FIG. 10A1 is obtained.

If the information on the character recognition error pattern and the correct character applicable to an error thereof is obtained (S805, "Yes"), the CPU 101 proceeds with the process to S806. In contrast, if the information on the character recognition error pattern and the correct character applicable to an error thereof is not obtained (S805, "No"), the CPU 101 proceeds with the process to S810.

In S806, the CPU 101 determines whether or not a character recognition error pattern occurring at the beginning or the end of the character string is included in the information on the character recognition error pattern applicable to the character string of the maximum likelihood candidate characters described previously and the correct character applicable to an error thereof obtained as the search result of S804 described above. If a character recognition error pattern occurring at the beginning or the end of the character string is included (S806, "Yes"), the CPU 101 proceeds with the process to S807. In contrast, if no character recognition error pattern occurring at the beginning or the end of the character string is included (S806, "No"), the CPU 101 proceeds with the process to S808.

In S807, the CPU 101 adds a search key by using the information on the character recognition error pattern occurring at the beginning or the end of the character string (a character recognition error pattern narrowed down based on the position of appearance in the character string) and the correct character applicable to the error thereof. First, the CPU 101 selects the most frequent one of the pieces of information on the character recognition error pattern occurring at the beginning of the character string and the correct character applicable to the error thereof. Further, the CPU 101 creates a character string in which a part corresponding to the character recognition error pattern occurring at the beginning of the character string with the maximum likelihood candidate characters of the character recognition result obtained in S802 described above is replaced with the selected information on the correct character applicable to the error and adds the created character string to the search key. Further, the CPU 101 selects the most frequent one of the pieces of information on the character recognition error pattern occurring at the end of the character string and the correct character applicable to the error thereof, creates a character string whose end is replaced in the same manner, and adds the created character string to the search key. Furthermore, the CPU 101 uses the selected information on the character recognition error patterns at the beginning and the end and the correct character applicable to the error thereof to create a character string whose beginning and end are replaced and adds the created character string to the search key. For example, if information indicating that the position of appearance in the character string is "beginning", the error pattern information is "0", and the correct pattern information is "8" applicable to the error pattern ID "201" is obtained in the search of S804, "8312346678" is registered as a search key as with the search key ID "2" in FIG. 10A2.

In accordance with the above, a search key character string in which a character recognition error(s) at the beginning, the end, or both thereof is taken into consideration on the character string with the maximum likelihood candidate characters of the character recognition result obtained in S802 described above is created and added to the search key. In response to completion of the process of S807, the CPU 101 proceeds with the process to S808.

In S808, the CPU 101 determines whether or not a character recognition error pattern other than the character recognition error pattern occurring at the beginning or the end of the character string is present as the search result of S804 described above. If a character recognition error pattern other than the character recognition error pattern occurring at the beginning or the end is present (S808, "Yes"), the CPU 101 proceeds with the process to S809. In contrast, if no character recognition error pattern other than the character recognition error pattern occurring at the beginning or the end is present (S808, "No"), the CPU 101 proceeds with the process to S810.

In S809, the CPU 101 uses the character recognition error pattern for a part other than the beginning or the end of the character string as the search result of S804 described above (a character recognition error pattern narrowed down based on the position of appearance in the character string) to create a search key character string and adds the created search key character string to the search key. Details of this process will be described later with reference to FIG. 9. In response to completion of the process of S809, the CPU 101 proceeds with the process to S810.

In S810, the CPU 101 uses the search key collected as described above (one or more search key character strings) to search the telephone number data 228 of FIG. 2. Accordingly, a search result of a telephone number is obtained. For example, if the search keys are as listed in FIG. 10A2 and the telephone number data 228 is as indicated in FIG. 10A3, a search result as illustrated in FIG. 10B1 is obtained.

Next, in S811, the CPU 101 determines whether or not a telephone number is obtained in the search result of S810 described above (whether or not a hit telephone number is present). If a telephone number is obtained in the search (S811, "Yes"), the CPU 101 proceeds with the process to S812. In contrast, if no telephone number is obtained in the search (S811, "No"), the CPU 101 ends the process of the present flowchart.

In S812, the CPU 101 compares the telephone number data obtained in the telephone number search of S810 described above (that is the same as any one of the search key character strings in the search key) with the character string having the maximum likelihood candidate characters of the character recognition result obtained in S802 described above and selects the most similar telephone number. While a method of simply comparing character strings with each other from the beginning on a character basis may be used for the comparison of character strings, comparison using edit distance calculation by dynamic programming (to determine two of the least edit distance as the most similar) may be used. Further, comparison between the structure of a character recognition result (depicted in FIG. 5B2) and a character string calculated by Viterbi algorithm (to determine the maximum likelihood as the most similar) may be used. For example, in the case of FIG. 10B1, it is determined that the telephone number data for the search result ID "1" is similar to the maximum likelihood candidate character of the character recognition result.

Next, in S813, the CPU 101 uses the telephone number information selected in S812 described above to add or correct the item values of the issuance source, the city name, and the telephone number of the extracted item. For example, the item values are added or corrected as with the extracted item IDs "1", "3", and "7" of FIG. 10B2 (the item values of the issuance source and the telephone number are corrected, and the item value of the issuance city information is added). In response to completion of the process of S813, the CPU 101 ends the process of the present flowchart. The process described above is performed on all the item values allocated with the character recognition result in S406, and thereby the item values of the issuance source, the city name, and the telephone number of the extracted item are added or corrected.

Figure 9:
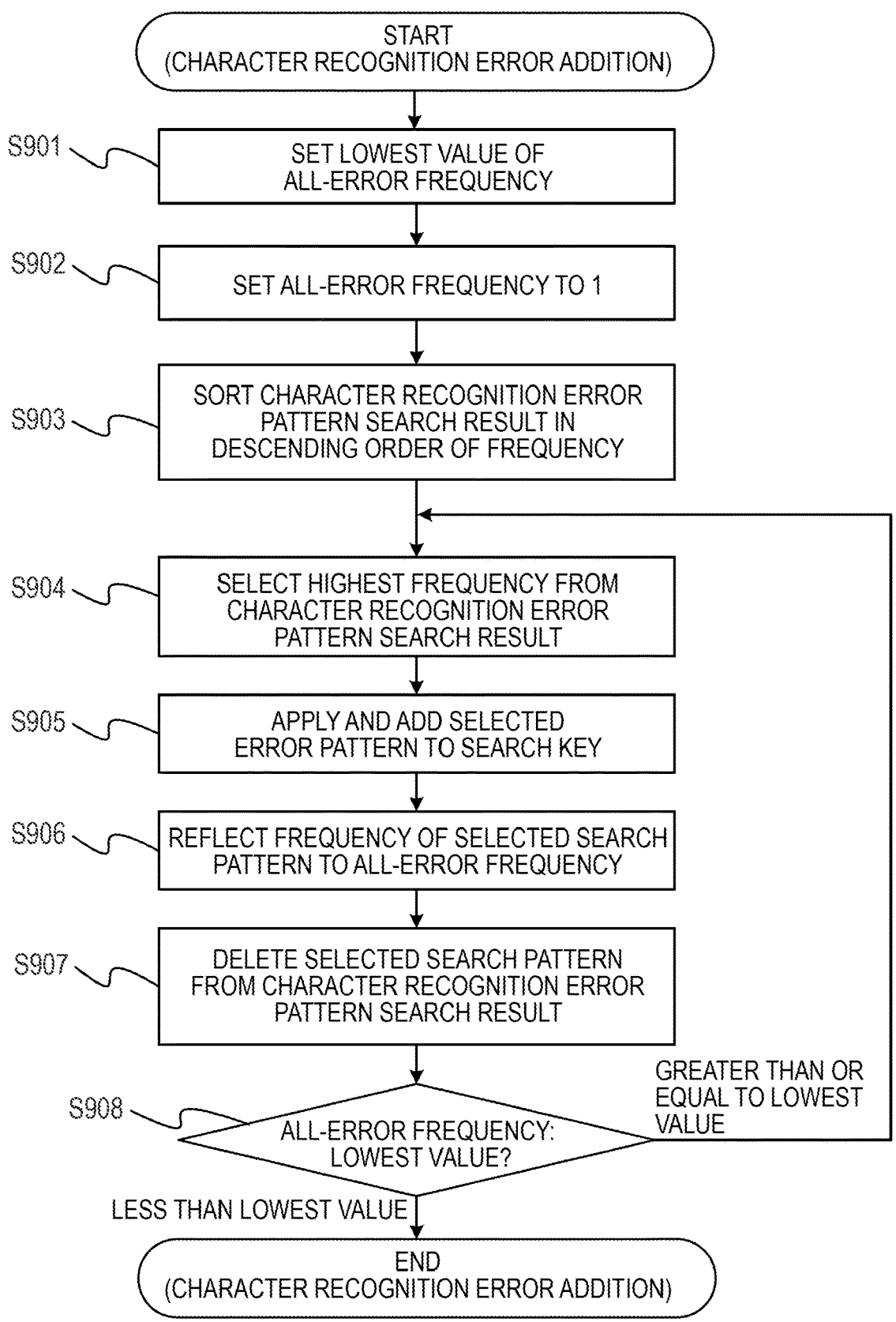
FIG. 9 is a flowchart illustrating a detailed process (S809) of adding a search key for a character recognition error pattern.

Search Key Character String Addition Flow by Character Recognition Error of Telephone Number Search FIG. 9 is a flowchart illustrating an example of the detailed process of adding the search key of the character recognition error pattern indicated in S809 of FIG. 8. The process of the flowchart corresponds to the detailed flow of the process of using the character recognition error pattern for a part other than the beginning or the end of the character string of the search result of S804 of FIG. 8 to create a search key character string and add the created search key character string to the search key. As a result of this process, a search key character string is added to a search key that uses a character recognition error pattern for a part other than the beginning or the end. In this process, a restriction on the application range using frequency information on the character recognition error pattern is applied, which characterizes the present embodiment. The above process is performed in the dictionary/character pattern matching process 225 of FIG. 2. That is, the process of the flowchart is implemented when a process program stored in the external storage device 106 or the ROM 102 is copied to the RAM 103 and executed and used by using the CPU 101 or the GPU 108.

In S901, the CPU 101 acquires and sets "the lowest value of all-error frequencies" used in this process from values set in advance in the dictionary/character pattern matching process 225 of FIG. 2.

Next, in S902, the CPU 101 sets "1" for the initial value of "all-error frequency" used in this process.

Next, in S903, the CPU 101 selects character recognition error patterns for the parts other than the beginning or the end of the character string from the search result of S804 of FIG. 8 and sorts the selected character recognition error patterns in descending order of "(occurrence) frequency" (hereafter referred to as "frequency") to be made available. Such sorted information is referred to as "sorted character recognition error pattern information".

Next, in S904, the CPU 101 selects one having the highest "frequency" out of the sorted character recognition error pattern information obtained in S903 described above.

Next, in S905, the CPU 101 uses the character recognition error pattern information selected in S904 described above to create a character string in which (one or more) applicable characters in the search key character string included in the search key is replaced with the correct information thereon and adds the created character string to the search key as the search key character string.

In S906, the CPU 101 reflects the "frequency" of the character recognition error pattern information selected in S904 described above to "all-error frequency" (the product of the "frequency" and "all-error frequency" is defined as a new "all-error frequency"). Since the "frequency" is less than or equal to one, multiplication of "frequency" by "all-error frequency" will reduce the "all-error frequency". While the detail will be described later, in S908 described later, "all-error frequency" is used to perform control of restricting the application range of the frequency information on the character recognition error pattern.

In S907, the CPU 101 deletes the character recognition error pattern information selected in S904 described above and the correct information thereon from the sorted character recognition error pattern information obtained in S903 described above. Accordingly, the selected character recognition error pattern information and the correct information thereon, which have been already been applied, will not be used in this process.

Next, in S908, the CPU 101 determines whether or not the "all-error frequency" is less than "the lowest value of all-error frequencies" obtained in S901 described above. If the "all-error frequency" is greater than or equal to "the lowest value of all-error frequencies" (S908, "Greater than or equal to lowest value"), the CPU 101 returns the process to S904.

In contrast, if the "all-error frequency" is less than "the lowest value of all-error frequencies" (S908, "Less than lowest value"), the CPU 101 ends the process of the present flowchart. That is, the CPU 101 uses character recognition error patterns in descending order of "frequency" and, once the accumulation of "frequency" of the used character recognition error patterns becomes less than a predetermined frequency (less than the lowest value of all-error frequencies), performs control not to use the subsequent character recognition error pattern. In accordance with this control, character recognition error patterns to be used are narrowed down, and the application range using frequency information on character recognition error patterns is restricted.

Example of Telephone Number Search

FIGS. 10A1 to 10B2 are diagrams illustrating, in a table form, an example of information used in the process of obtaining issuance source information from an item value of a telephone number of S407 of FIG. 4 and adding the obtained issuance source information to the item value (the process of FIG. 8 and FIG. 9) for the document image of FIG. 3. Note that FIG. 5B2 is used as a character recognition result of the item value of the telephone number to be searched for.

FIG. 10A1 illustrates an example of the content of the character recognition error pattern dictionary 226 of FIG. 2. Each character recognition error pattern has an ID (error pattern ID) for identification and includes character recognition error pattern information (a character or a character string), correct pattern information (a character or a character string), a position of appearance in a character string, and (occurrence) frequency information.

The character recognition error pattern dictionary 226 has been created based on errata information on a character recognition result by causing the character recognition process 212 of FIG. 2 to perform various processes on characters, texts, or documents in advance as the characteristics of the character recognition process 212 of FIG. 2 to collect the errata information.

Since the number of occurrences of a character itself differs for respective characters, the occurrence frequency of errors is a value obtained by dividing the number of occurrences of the character recognition error pattern information by the number of occurrences of the correct pattern information, and this corresponds to an occurrence probability.

Further, since characteristics of errors differ at the beginning or the end of a character string in accordance with a character or a peripheral image (including a trash image or the like mixed during an image scan) near the character string, the embodiment can distinguish the position of appearance in a character string in handling the same.

FIG. 10A2 illustrates an example of information on the search key character string in the search key when the process of FIG. 8 and FIG. 9 is performed.

A search key character string has IDs (search key IDs) (in registration order) for the identification thereof. The all-frequency lists all-frequency information at registration of the search key character string. The search key ID "1" has been registered without any change based on the character string of the maximum likelihood characters of FIG. 5B2 in S803 of FIG. 8. The search key ID "2" has been registered by applying the character recognition error pattern at the beginning of the position of appearance in the character string of the error pattern ID "201" of FIG. 10A1 to the character string of the maximum likelihood characters of FIG. 5B2 in S807 of FIG. 8. The search key IDs "3" to "6" have been registered by applying the error pattern ID "101" of FIG. 10A1 based on the search key ID "1" and "2" already registered in S905 of FIG. 9. Since there are two "6" in the search key character strings of the search key IDs "1" and "2", four search key character strings have been created. Note that, in this example, since the subsequent application of character recognition error patterns is inhibited because the all-error frequency is below the lowest value of the all-error frequencies due to S906 and S908 of FIG. 9, only the four search key character strings are registered as the search key character strings.

FIG. 10A3 illustrates an example of the content of the telephone number data 228 of FIG. 2.

Each individual telephone number data has a dictionary ID for identification and includes information on a registered corporate name, a corporate ID, and city information for a telephone number. The city information is formed of a country identification information in accordance with ISO3166-1, an area identification information (a prefecture number in the case of Japan), and a city name (name of ward, city, town or village). In practice, search index information (not illustrated) is added so that a fast search can be performed with a telephone number.

FIG. 10B1 illustrates search results obtained when the telephone number data of FIG. 10A3 is searched for the telephone number which matches the search key character string of FIG. 10A2, and these search results correspond to the search result of S810 of FIG. 8.

In each search result, an edit distance has been added as a result of comparison being performed between the search key character string in FIG. 10A2 and the character string of the corresponding telephone number in FIG. 10A3 (calculation of an edit distance by using dynamic programming). Since one with the smaller edit distance is selected in S812 of FIG. 8, the search result ID "1" of FIG. 10B1 will be selected in this example.

FIG. 10B2 illustrates a result obtained after addition or correction using the search result of FIG. 10B1 that is the search result of S407 of FIG. 4 has been applied to the extracted result of FIG. 7B3 that is the result of S406 of FIG. 4.

It can be seen that, in accordance with the character recognition result of item values, the item values of the issuance source of the extracted item ID "1" and the item value of the telephone number of the extracted item ID "3" have been corrected, respectively, and the issuance city information of the extracted item ID "7" has been added (the extraction rule ID "10" is the ID value of the telephone number search).

Confirmation and Correction Screen for Item Value

Figure 11:
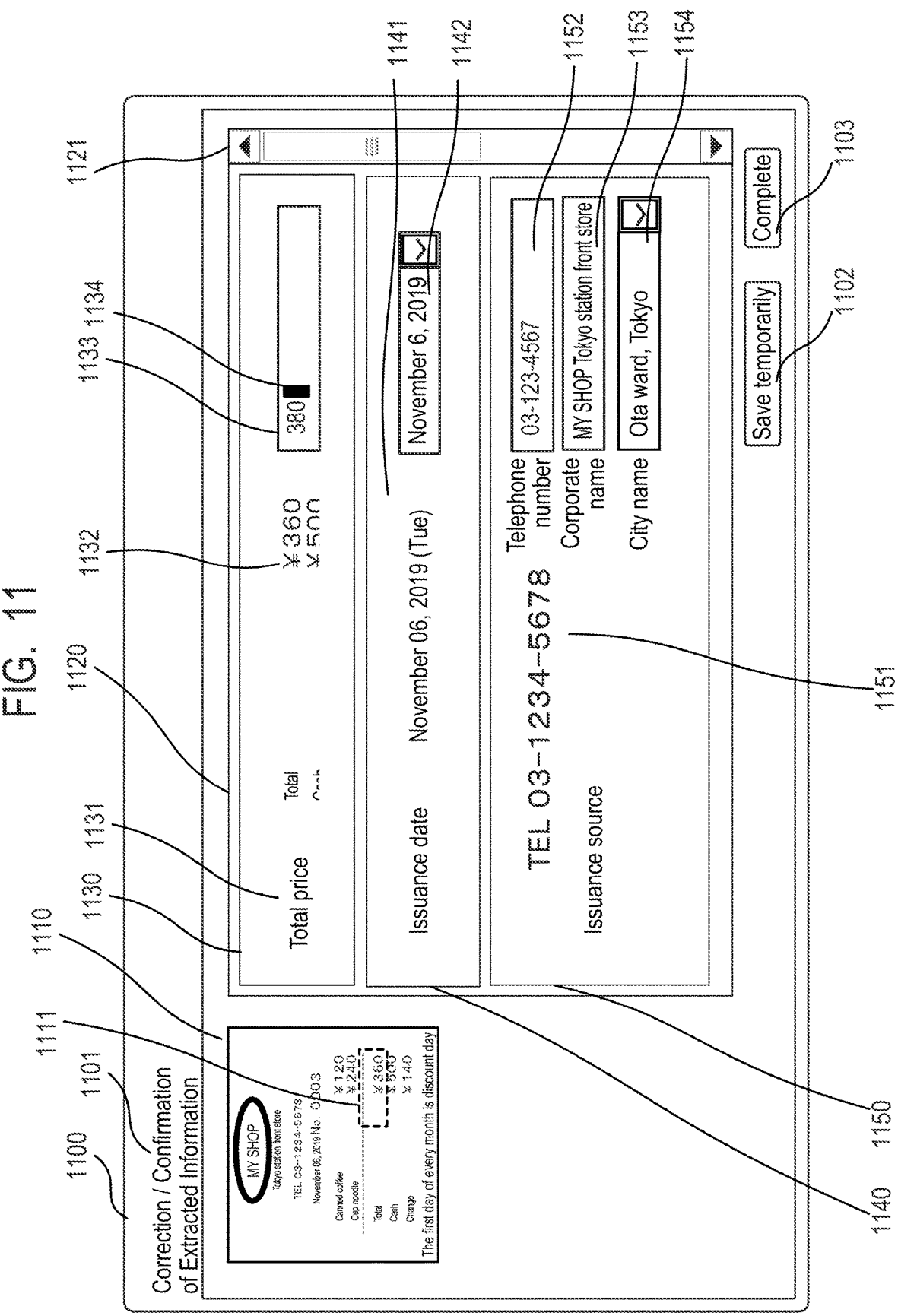
FIG. 11 is a diagram illustrating a screen for confirmation or correction of an item value by the user of a specified information correction unit.

FIG. 11 is a diagram illustrating an example of a screen of the confirmation/correction of item value by user 231 of the specified information correction unit 230 of FIG. 2 and is displayed in S409 of FIG. 4.

The screen of FIG. 11 is assumed to be used in a multi-window GUI environment. This screen is for performing an operation to allow the user to confirm whether or not a correct value has been successfully extracted through matching between the scanned document image 201 of FIG. 3 and the character string of the item value of the extracted item obtained in S406 and S407 of FIG. 4 and correct an error, if any.

A window 1100 forms a screen displayed to the user in S409 of FIG. 4. A title 1101 indicates that this screen is a screen for correction or confirmation of the extracted item value (extracted information).

A temporary save button 1102 is a button for, when pressed, temporarily saving the edited content on the window 1100, temporarily ending the editing operation, and then closing the window 1100. After this operation, the edited content can be recovered on the window 1100 to resume the editing operation.

A complete button 1103 is a button for, when pressed, saving the edited content on the window 1100 as the edited result, then completing the editing operation, and closing the window 1100.

A document image display 1110 is an area to display the whole scanned document image 201 of FIG. 3.

A region-of-interest display 1111 is a frame line indicating a region of interest in the document image display 1110.

A confirmation display list 1120 is an area to display item values of the extracted item obtained in S406 and S407 of FIG. 4 in a list as with displays 1130, 1140, and 1150 to allow the user to perform confirmation or correction.

A scrollbar 1121 is a scrollbar operated when there are many item values of extracted items to be displayed in the confirmation display list 1120 and not all of them can be displayed at once in the confirmation display list 1120. The user is able to edit all the item values of the extracted items in the confirmation display list 1120 by operating the scrollbar 1121.

A confirmation display 1130 is one of the areas that display item values of individual extracted items of the confirmation display list 1120 to allow the user to perform confirmation or correction and is related to the item value of the extracted item "total price". Similarly, a confirmation display 1140 is one of the areas that allow the user to perform confirmation or correction and is related to the extracted item "issuance date". Further, a confirmation display 1150 is one of the areas that allow the user to perform confirmation or correction and is related to respective item values of "telephone number", "corporate name", and "city name".

An item name display 1131 displays a name of an extracted item and expresses that the confirmation display 1130 is related to the item value of "total price". An item value image display 1132 displays a cut out partial image of the region of interest in the scanned document image 201 of FIG. 3 based on the position and the size of a character recognition result of an item value in the document image. An extracted item value display 1133 is an area in which a character string of an extracted item value can be confirmed or corrected, corresponds to display of the character string itself, and at the same time, enables edition thereof. When the user does not edit the character string displayed in the extracted item value display 1133 or leaves the original value unchanged, this means that the user has confirmed the value as being correct. When the user edits the extracted item value display 1133 and changes the content by using a cursor 1134, this means that the user has applied correction to have a correct value. The same applies to the confirmation displays 1140 and 1150, and item value image displays 1141 and 1151 display the cut out partial image of the regions of interest in the scanned document image 201 of FIG. 3, respectively. Extracted item value displays 1142, 1152, 1153, and 1154 are areas in which character strings of extracted item values can be confirmed or corrected, respectively, in the same manner as with the extracted item value display 1133.

In FIG. 11, the user is currently in a situation where he or she has selected "total price" of the confirmation display 1130 as an extracted item to confirm or correct. Thus, the frame of the confirmation display 1130 is displayed in a selected state. In accordance therewith, for the region of interest in the scanned document image 201 of FIG. 3 in the item value image display 1132, the region is displayed with the dotted line frame of the region-of-interest display 1111 in the document image display 1110 so that the user may easily locate the position thereof in the document image. Further, to enable the user to edit the character string of the item value of the extracted item "total price" of the extracted item value display 1133, the text cursor 1134 is displayed and indicates a state where edition is available. In this state, the user is ready to confirm or correct the item value of the extracted item "total price". The same applies to the confirmation displays 1140 and 1150. Since the extracted item value displays 1142, 1152, 1153, and 1154 are to enable edition of character strings of item values, respectively, but are not in a selected state, no text cursor is displayed therein.

In such a way, the user may use the screen of FIG. 11 to confirm or correct the item values of all the extracted items.

As described above, when a large amount of error pattern information on character recognition is collected in advance, information about an occurrence frequency or an occurrence place of the error is also collected. Further, error pattern information on character recognition is selected and used in accordance with the occurrence frequency or the occurrence place, and thereby the processing efficiency of a correction process during use of a large amount of error pattern information on character recognition is increased in correction of a character recognition result in accordance with error pattern information on character recognition and estimation of the content. Further, at the same time, by narrowing down the error pattern information on character recognition to be used, it is possible to reduce the processing time. Accordingly, the effect of a process of correcting a character recognition result is increased, and a reduction in processing time is realized. It is therefore possible to contribute to time saving through increased efficiency of a user operation in data entry work and contribute to a reduction in the workload thereof.

Second Embodiment

In the first embodiment described above, an occurrence frequency or a position of appearance (the beginning, the end, or another part) is included as appearance information in error pattern information on character recognition, and such information is used to apply error pattern information on character recognition. Note that the beginning and the end are likely to appear near the ruled line in a business form or the like, and an error in character recognition is likely to occur due to difficulty in discriminating a character image from the ruled line image or the like. Further, in some business forms or the like, the background of characters may be colored or provided with a dotted line, or characters may be provided with an underline, and an error in character recognition is likely to occur also in such a case for the same reason. Accordingly, in the second embodiment, when error pattern information on character recognition is collected, not only the information about the occurrence frequency or the occurrence place of the error but also information on the presence or the position, if present, of a ruled line or the character background is collected as the appearance information, and error pattern information on character recognition is selected and used in accordance with these pieces of information. Details will be described below.

Appearance State of Character Recognition Error Information

FIG. 12 is a diagram illustrating an example of character recognition error pattern information in the second embodiment in a table form.

The field of "Ruled line/Character background" in FIG. 12 is a field added to FIG. 10A1 illustrated in the first embodiment. Errors in character recognition occur with a phenomenon that the tendency of errors differs in accordance with the color or a pattern of the background of characters, the type or the pattern of a close ruled line or ruled lines, or the like. To address this, when the character recognition process 212 of FIG. 2 is caused to process a large number of and a variety of characters, texts, documents, or the like to collect character recognition error patterns in accordance with the appearance state of the character, information on the appearance state is also recorded. The dictionary/character pattern matching process 225 is then used, and thereby correction of an error in character recognition or a search for a correct corporate name or the like is made available.

For example, the error pattern ID "103" of FIG. 12 is used as the character recognition error pattern information on a character string whose position of appearance in the character string is "middle" and which has "background color". Further, the error pattern ID "201" is used as the character recognition error pattern information on a character string whose position of appearance in the character string is "beginning" and in which a ruled line is present in "forward" of the character string. Further, the error pattern ID "202" is used as the character recognition error pattern information on a character string whose position of appearance in the character string is "end" and in which a ruled line is present in "backward" of the character string.

In the dictionary/character pattern matching process 225, with the use of such character recognition error pattern information, it is possible to more accurately apply correction of a character recognition result. The second embodiment can be applied without impairing the feature of the first embodiment and makes it possible to more accurately perform correction of an error in character recognition or a search for a correct corporate name or the like.

As described above, when a large amount of error pattern information on character recognition is collected in advance, information about the occurrence frequency or the occurrence place of the error, a ruled line/the background, or the like is also collected. The error pattern information on the character recognition is then selected (narrowed down) and used in accordance with the occurrence frequency or the occurrence place of the error, a ruled line/the background, or the like. Accordingly, in correction of a character recognition result in accordance with error pattern information on character recognition and estimation of the content, the processing efficiency of a correction process during use of a large amount of error pattern information on character recognition is increased. Further, at the same time, by narrowing down the error pattern information on character recognition to be used, it is possible to reduce the processing time. This increases the efficiency in a process of correcting a character recognition result and realizes a reduction in processing time. It is therefore possible to contribute to time saving through increased efficiency of a user operation in data entry work and contribute to a reduction in the workload thereof.

Note that at least some of the document image analysis unit 210, the specified information extraction unit 220, and the specified information correction unit 230 may be implemented by one or more information processing apparatuses that are different from the image processing apparatus 100. For example, these features may be implemented on a server (an information processing apparatus) implemented by using a cloud computing technology. Such an information processing apparatus receives the scanned document image 201 from the image processing apparatus 100 and performs the process from S402 of FIG. 4. Note that, for confirmation or correction of an item value performed by the user via presentation of the screen as illustrated in FIG. 11, the user may log in the server (the information processing apparatus) or the like described above and perform the confirmation or correction from a client computer or the like.

As described above, according to each embodiment, the use of error pattern information on character recognition is restricted based on the occurrence frequency or the occurrence place of the error or the like. Accordingly, even when there is a large amount of error pattern information on character recognition, it is possible to increase the processing efficiency of correction of erroneous recognition using a character error pattern while maintaining the accuracy, and it is possible to prevent the processing time from increasing (slowing down). As a result, it is possible to contribute to time saving through increased efficiency of a user operation in data entry work and contribute to a reduction in the workload thereof.

Note that the configuration of various data and the content thereof described above are not limited thereto and, obviously, can be formed of various configurations or contents in accordance with a use or a purpose.

Although some embodiments have been described above, the present invention can take a form of implementation as a system, an apparatus, a method, a program, a storage medium, or the like, for example. Specifically, the present invention may be applied to a system formed of a plurality of devices or may be applied to an apparatus formed of a single device.

Further, all the configurations that combine respective embodiments described above fall in the scope of the present invention.

Other Embodiment

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-148345, filed Sep. 13, 2021, which is hereby incorporated by reference herein in its entirety.

What is claimed is:

1. An information processing apparatus comprising:
a memory that stores a program; and
a processor that executes the program to perform:
obtaining a character recognition result by performing character recognition on a document image; and
applying correction using a character recognition error pattern to the obtained character recognition result,
wherein the character recognition error pattern includes error pattern information on a character recognition result of a part where an error occurs in the character recognition, correct pattern information applicable to the part where the error occurs, information on a frequency that the error occurs, and information on a state where the error occurs, and
wherein the character recognition error pattern to be used in the correction is narrowed down based on the information on the frequency that the error occurs and the information on the state where the error occurs.

2. The information processing apparatus according to claim 1, wherein the character recognition error pattern to be used in the correction is narrowed down by using the character recognition error pattern in descending order of the frequency that the error occurs and, once accumulation of the frequency that the error occurs included in the used character recognition error pattern becomes less than a predetermined frequency, not using the subsequent character recognition error pattern.

3. The information processing apparatus according to claim 1,
wherein the information on the state where the error occurs indicates that a position of appearance in a character string of characters where an error occurs is the beginning, the end, or another part of the character string, and wherein the character recognition error pattern to be used in the correction is narrowed down in accordance with a position in a character string of respective characters included in the character recognition result.

4. The information processing apparatus according to claim 3,
wherein the information on the state where the error occurs further includes information on a ruled line appearing near a character where an error occurs and information on a background of a character where an error occurs, and
wherein the character recognition error pattern to be used in the correction is narrowed down in accordance with a position in a character string of respective characters included in the character recognition result, a state of the ruled line, and a state of the background.

5. The information processing apparatus according to claim 1, wherein the processor executes the program to further perform:
displaying the corrected character recognition result on a display; and
receiving confirmation or correction performed by a user,
wherein the character recognition error pattern is generated based on the confirmed or corrected character recognition result.

6. The information processing apparatus according to claim 1 further comprising a scanner that reads a document to generate the document image.

7. The information processing apparatus according to claim 1 further comprising a receiver that receives the document image.

8. An information processing method comprising:
obtaining a character recognition result by performing character recognition on a document image; and
applying correction using a character recognition error pattern to the obtained character recognition result,
wherein the character recognition error pattern includes error pattern information on a character recognition result of a part where an error occurs in the character recognition, correct pattern information applicable to the part where the error occurs, information on a frequency that the error occurs, and information on a state where the error occurs, and
wherein the character recognition error pattern to be used in the correction is narrowed down based on the information on the frequency that the error occurs and the information on the state where the error occurs.

9. A non-transitory computer readable storage medium that stores a program,
wherein the program causes a processor to perform:
obtaining a character recognition result by performing character recognition on a document image; and
applying correction using a character recognition error pattern to the obtained character recognition result,
wherein the character recognition error pattern includes error pattern information on a character recognition result of a part where an error occurs in the character recognition, correct pattern information applicable to the part where the error occurs, information on a frequency that the error occurs, and information on a state where the error occurs, and
wherein the character recognition error pattern to be used in the correction is narrowed down based on the information on the frequency that the error occurs and the information on the state where the error occurs.

\* \* \* \* \*